United States Patent [19]

Sakai et al.

[11] Patent Number: 5,079,705
[45] Date of Patent: Jan. 7, 1992

[54] VEHICLE AUTOMATIC TRANSMISSION CONTROL SYSTEM

[75] Inventors: Ichiro Sakai; Yasuhisa Arai; Hiroki Matsui; Masataka Yamamoto, all of Saitama, Japan

[73] Assignee: Honda Giken Kogyo Kabushiki Kaisha, Tokyo, Japan

[21] Appl. No.: 367,461

[22] Filed: Jun. 16, 1989

[30] Foreign Application Priority Data

Jun. 17, 1988 [JP] Japan .................. 63-149375

[51] Int. Cl.$^5$ .............................................. B60K 41/06
[52] U.S. Cl. ................... 364/424.1; 74/866; 364/431.07
[58] Field of Search ............ 364/424.1, 431.07; 74/866

[56] References Cited

U.S. PATENT DOCUMENTS

| | | | |
|---|---|---|---|
| 4,841,815 | 6/1989 | Takahashi | 364/424.1 |
| 4,885,690 | 12/1989 | Suhimmel et al. | 364/424.1 |
| 4,905,786 | 3/1990 | Miyake et al. | 364/424.1 |

FOREIGN PATENT DOCUMENTS

| | | |
|---|---|---|
| 174788 | 3/1986 | European Pat. Off. |
| 194799 | 9/1986 | European Pat. Off. |
| 238310 | 9/1987 | European Pat. Off. |
| 291183 | 11/1988 | European Pat. Off. |
| 347263 | 12/1989 | European Pat. Off. |
| 3447638 | 7/1986 | Fed. Rep. of Germany |
| 3735184 | 5/1989 | Fed. Rep. of Germany |

OTHER PUBLICATIONS

Jp. Abstract of Appln. 63-246546, 10/13/88.

*Primary Examiner*—Salvatore Gangialosi
*Attorney, Agent, or Firm*—Lyon & Lyon

[57] ABSTRACT

A system for controlling automatic transmissions equipped with a motor vehicle utilizing fuzzy logic. In the system, fuzzy production rules have been prepared based upon an expert driver's judgments and operation made on a vehicle with a manually shifted transmission. Various operating conditions including opening degree of a throttle valve and road speed of the vehicle are detected and from the detected value, various predictions are made such as an appropriateness of vehicle response to a gearshift intended by the driver and engine output change that would occur should the transmission be shifted to a given gear. These measured or estimated values are put on a common scale named universe of discourse and each membership values degree of the aforesaid rules is successively calculated. Among the rules, one rule is finally selected and according to a gear position indicated in the selected rule, the current gear is shifted up or down or is held at the present position.

17 Claims, 22 Drawing Sheets

| θTH \ ΔθTH | ΔθTH0 | --- | ΔθTH8 |
|---|---|---|---|
| θTH0 | | | |
| ⋮ | Desired PS change DEPS(i,j) | | |
| ⋮ | | | |
| θTH8 | | | |

Fig. 23

(FUZZY REASONING)
- S700: Calculate grade values of membership functions
- S702: Compile retrieval matrix
- S704: Carry out minimax calculation to determine control command value
- END

Fig. 25

(GRADE CALCULATION)
- S800: Set data for physical quantity numbers
- S802: Initialize address registers
- S804: Read CNth membership value (DAT)
- S806: $\mu(CN) \leftarrow DAT$
- S808: $CN \leftarrow CN+1$
- S810: CN>MAXCN? N→loop back, Y→END

Fig. 26

| Address code No. | Physical quantity No. | Membership functions |
|---|---|---|
| 1 | 1 | (decreasing ramp) Vehicle speed |
| 2 | 1 | (triangle) Vehicle speed |
| ⋮ | ⋮ | ⋮ |
| MAX CN | 20 | (trapezoid) Control toughness |

Fig. 27

(RAM)

| Physical quantity No. | 1 Vehicle speed | 2 Acceleration | 3 Engine speed | | 25 Gear position |
|---|---|---|---|---|---|
| DATA | --- | --- | --- | | --- |

Fig. 28

| Address code No. | 1 | 2 | 3 | ····· | i | | MAXCN |
|---|---|---|---|---|---|---|---|
| Grade value | 0.0 | 0.8 | 0.6 | | $\mu(i)$ | | $\mu(MAXCN)$ |

Fig. 24(a)

| Rule No. | | | | | Conclusion | Meaning of rule |
|---|---|---|---|---|---|---|
| 1 | $\mu$ 1.0, Ne 6000(rpm) | | | | -3 -2 -1 0 1 2 3 | If engine speed has become extremely high then shift up one gear to protect engine. |
| 2 | $\mu$ 0.95, So 1 2 3 4 | V 0 10 60 (km/h) | $\theta_{TH}$ 0 1/8 8/8 (WOT) | | -3 | If throttle is fully closed, vehicle speed is very low and current gear is the top then shift down to the 1st. |
| 3 | $\mu$ 0.95, So 1 2 3 4 | V 0 10 60 | $\theta_{TH}$ 0 1/8 8/8 | | -2 | If throttle is fully closed, vehicle speed is very low and current gear is the 3rd then shift down to the 1st. |
| 4 | $\mu$ 0.95, So 1 2 3 4 | V 0 10 60 | $\theta_{TH}$ 0 1/8 8/8 | | -1 | If throttle is fully closed, vehicle speed is very low and current gear is the 2nd then shift down to the 1st. |

Fig. 24(b)

| Rule No. | | | | | | Conclusion | Meaning of rule |
|---|---|---|---|---|---|---|---|
| 5 | μ 0.95–0 graph (So, 2-4) | 0 10 12 V graph | −⅛ 0 θTH graph | | | −2 | If throttle is fully closed, vehicle speed is low and current gear is the top then shift down to the 2nd. |
| 6 | μ 0.95–0 graph (So, 2-4 triangle) | 0 10 15 V graph | −⅛ 0 θTH graph | | | −1 | If throttle is fully closed, vehicle speed is low and current gear is the 3rd then shift down to the 2nd. |
| 7 | μ 0.9–0 graph (Ne, 6000) | −0.4 0 +0.4 (km/h/0.15sec) α graph | −1 0 +1 (°/0.1sec) ΔθTH graph | −1 −0.2 +1 R1/Q1 graph | 0 1 2 PS ratio graph | 1 | When vehicle is accelerating and throttle opening is constant, if PS ratio is near 1.0 and R1/Q1 is good then shift up by one gear. |
| 8 | μ 0.9–0 graph (So, 2-4) | 0 5 Desired PS ratio graph | | | | 0 | If throttle has suddenly returned to fully closed position then maintain current gear. |

Fig. 24(c)

| Rule No. | | | | | Conclusion | Meaning of rule |
|---|---|---|---|---|---|---|
| 9 | graph (a, 0.9) | graph (ΔθTH) | graph (R1/Q1) | graph (Ne, 6000) | 1 | When vehicle is accelerating moderately, if engine speed is not low and R1/Q1 is good then shift up by one gear. |
| 10 | graph (Time lapse sec) | graph (ΔθTH) | | | 0 | Immediately after gear-shift operation, if throttle opening is unchanged then do not shift. |
| 11 | graph (Desired PS ratio) | graph (ΔθTH) | | | 0 | Even if throttle is opened if desired PS ratio is small, then do not shift. |
| 12 | graph (R1/Q1) | graph (Post-gearshift Ne 6000(rpm)) | graph (PS ratio) | graph (ΔθTH) | 3 | If throttle has returned in closing direction indicating intention to cruise then shift up three gears for optimizing both R1/Q1 and F.E. |

Fig. 24(d)

| Rule No. | | | | Conclusion | Meaning of rule |
|---|---|---|---|---|---|
| 13 | | | | | If throttle has returned in closing direction indicating intention to cruise then shift up two gears for optimizing both R1/Q1 and F.E. |
| 14 | | | | | If throttle has returned in closing direction indicating intention to cruise then shift up one gear for optimizing both R1/Q1 and F.E. |
| 15 | | | | | If throttle has been opened but vehicle cannot keep pace then shift down three gears to obtain PS ratio of 1.0. |
| 16 | | | | | If throttle has been opened but vehicle cannot keep pace then shift down two gears to obtain PS ratio of 1.0. |

Fig. 24(e)

| Rule No. | | | | Conclusion | Meaning of rule |
|---|---|---|---|---|---|
| 17 | μ 0.9 / Desired PS ratio (0–5) | Desired post-gearshift PS ratio (0–5) | Post-gearshift Ne (0–6000) | −1 | If throttle has been opened but vehicle can not keep pace then shift down one gear to obtain PS ratio of 1.0. |
| 18 | μ 0.9 / V (0–60), 02 | | | 0 | If vehicle speed is very low or zero then maintain current gear (the 1st). |
| 19 | μ 0.9 / R1/Q1 (−1 to +1) | | | 0 | If shifting up is predicted to result in lack of R1/Q1 then maintain current gear. |
| 20 | μ 0.9 / R1/Q1 (−1 to +1) | | | 0 | If shifting up is predicted to result in lack of R1/Q1 then maintain current gear. |

Fig. 30

| Rule No. \ Label | QL | 1 | 2 | 3 | 4 | 5 | 6 | ---- | 14 | OUTPUT |
|---|---|---|---|---|---|---|---|---|---|---|
| 1 | 1 | 3 |  |  |  |  |  |  |  | +1 |
| 2 | 3 | 4 | 1 | 5 |  |  |  |  |  | −3 |
| ⋮ |  |  |  |  |  |  |  |  |  | −2 |
| ⋮ |  |  |  |  |  |  |  |  |  |  |
| N | 5 | 25 | 2 | 9 | 21 | 17 |  |  |  | −1 |

CODE No. (MAT(n,l))

Fig. 31

| Rule No. \ Label | 1 | 2 | 3 | 4 | 5 | 6 | 7 | --- | --- | 14 |
|---|---|---|---|---|---|---|---|---|---|---|
| 1 | 0.7 |  |  |  |  |  |  |  |  |  |
| 2 | 0 | 0.95 | 0.95 |  |  |  |  |  |  |  |
| ⋮ |  |  |  |  |  |  |  |  |  |  |
| ⋮ |  |  |  |  |  |  |  |  |  |  |
| N | 0.3 | 0.4 | 0.8 | 0.8 | 0.1 |  |  |  |  |  |

| Rule No. | QL | CODE No. | | | | | | OUTPUT |
|---|---|---|---|---|---|---|---|---|
| 1 | 1 | 3 | | | | | | +1 |
| 2 | 3 | 4 | 1 | 5 | | | | -3 |
| 3 | 3 | 6 | 1 | 5 | | | | -2 |
| ⋮ | | | | | | | | |
| N | 1 | 21 | | | | | | -1 |

| Rule No. | Membership value | | | | | |
|---|---|---|---|---|---|---|
| 1 | 0.7 | | | | | |
| 2 | 0 | 0.95 | 0.95 | | | |
| 3 | 0 | 0.95 | 0.95 | | | |
| ⋮ | | | | | | |
| N | 0.7 | | | | | |

| Rule No. | μ RULE | LABEL |
|---|---|---|
| 1 | 0.7 | 1 |
| 2 | 0 | 1 |
| 3 | 0 | 1 |
| ⋮ | | |
| N | 0.7 | 1 |

VEHICLE AUTOMATIC TRANSMISSION CONTROL SYSTEM

BACKGROUND OF THE INVENTION

1. Field of the Invention

This invention relates to a vehicle automatic transmission control system and more particularly to a vehicle automatic transmission control system which applies fuzzy logic to enable control resembling that based the judgments and operations of an expert driver in the case of a conventional manually shifted vehicle transmission.

2. Description of the Prior Art

In driving a vehicle equipped with a conventional manually shifted transmission, the driver judges the appropriate time or instant for changing gears on the basis of his observation of the surrounding circumstances and the vehicle operating state and then, when he has determined that the time is right, operates the clutch pedal and the gearshift lever to shift the transmission to what he has decided is the appropriate gear. This is a fairly troublesome operation, especially because it has to be done quite frequently, and to make it unnecessary there has been developed the automatic transmission. Today, the majority of new vehicles sold are equipped with automatic transmissions. The control system for one type of automatic transmission includes a shift valve as one member of a hydraulic circuit. To one side of this valve there is applied a throttle pressure proportional to the degree of opening of the throttle and to the other side there is applied a governor pressure proportional to the vehicle speed, and gear changing is carried out automatically by supplying/cutting off hydraulic pressure to/from a gear clutch in accordance with the ratio between the two pressures. More recently, this type of control has been replaced with an electronic control system employing a microcomputer which has a gearshift program stored in a memory thereof. In this system, the degree of throttle opening and the vehicle speed are used as address data for retrieving the proper time for changing gears from the gearshift program and then a solenoid valve is energized/de-energized accordingly to drive the shift valve so as to cause it to shift the transmission.

In the conventional automatic transmission the time for changing gears is determined solely on the basis of the degree of throttle opening and the vehicle speed instead of in accordance with the judgment and operations of the driver himself. This inevitably causes unnatural gear changing. For example, when the vehicle is running up hill and the driver returns the throttle opening to that for cruising on level ground, the transmission will shift up, depending on the vehicle speed at the time. As a result, the amount of reserve power available will become insufficient, making it necessary for the driver to press down on the accelerator pedal again, which will cause the transmission to shift down. This shiftup, shiftdown cycle will repeat itself, giving the driver the impression of being busy. This same problem also arises in such cases as when the vehicle is used to pull a camper, when the weight of the vehicle changes because of a change in the weight of the load or the like, or when the engine charging efficiency declines during driving at high altitudes.

The answer to why the driver presses down on the accelerator pedal and thus opens the throttle valve is simply that he wants to accelerate and expects that when he depresses the accelerator pedal further the vehicle will respond to his desire. Stated in another way, the reason that the aforesaid problem arises is that the control system issues a gearshift command notwithstanding that the vehicle has been deprived of sufficient controllability by a decrease in reserve power. Thus, the problem arises because the control system does not do what it should do, namely, to accurately ascertain the motive force and the driving resistance and shift up only after confirming that the motive force is greater than the driving resistance, i.e. after confirming that there is reserve force available.

A way for overcoming this problem was recently proposed in Japanese Laid-open Patent Publication No. 60(1985)-143133. According to the proposed technique, the amount of torque desired by the driver is determined from the amount of depression of the accelerator pedal and the desired acceleration is calculated by subtraction of the pre-calculated climbing resistance. Further, the one among a plurality of pre-prepared optimum fuel-economy gearshift diagrams which is best matched to the calculated climbing resistance is selected, the degree of opening of the throttle is controlled on the basis of data obtained from the constant acceleration locus on the selected gearshift diagram, and the new degree of throttle opening and the vehicle speed are used as address data for determining from the gearshift diagram what gearshift operation should be carried out for maintaining the acceleration prior to the change in the degree of throttle opening.

With this prior art method, however, while the gearshift judgment is made with consideration being given to the torque desired by the driver, it is after all made solely on the basis of a predetermined gearshift diagram and thus is able to respond only to present conditions. What is more, as in the earlier controls, this technique also determines the gearshift timing solely on the basis of the degree of throttle opening and the vehicle speed and in this point it has the same shortcomings as the earlier controls.

In other words, if the vehicle were one with a manually shifted transmission, the driver would have been aware that he was driving up hill and avoided making an improper shiftup at the time of changing gears. That is, because he has a grasp of the surrounding circumstances and other aspects of the vehicle operation, the driver of the vehicle with the manually shifted transmission would be aware of a magnitude of the motive force and would also anticipate the increase/decrease in the tractive force apt to result if he should shift gears. He would thus decide when to shift gears by selection from among the various rules he has learned through his driving experience. What this means is that the aforesaid inconvenience of the conventional control arises because the judgments and operations of the human driver are ignored, i.e. not reflected in the control. More specifically, in the conventional vehicle gearshift control systems the gearshift timing is, as a basic principle, decided mechanically from the degree of throttle opening and the vehicle speed, and thus is not capable of determining this timing on the basis of a large number of vehicle operation variables. As a result, the aforesaid problems cannot be avoided.

SUMMARY OF THE INVENTION

It is therefore an object of the invention to provide a vehicle automatic transmission control system which overcomes the drawbacks of the prior art.

Another object of the invention is to provide a vehicle automatic transmission control system which applies fuzzy logic for incorporating in its system of automatic transmission control the judgments and operations of the driver of a vehicle with a manually shifted transmission, whereby gearshift judgments resembling those made at the volition of a human being become possible.

For realizing the aforesaid objects, the present invention provides a system for controlling a vehicle automatic transmission, comprising; first means for detecting operating condition of the vehicle including engine speed, degree of throttle opening, change in the throttle opening degree, vehicle speed and change in the vehicle speed; second means for predicting, with respect to gears to which it is possible to shift from the gear currently engaged, change in the vehicle operating condition, including change in reserve motive force available, which would occur upon shifting each of such gears and third means for establishing a membership function on the detected values and the predicted value. Fourth means is provided for carrying out fuzzy reasoning on the basis of the detected values and the predicted value using the membership function assigned thereto, to determine a gear to be engaged and actuator means is provided for driving a gearshift mechanism in response to the determined result.

BRIEF DESCRIPTION OF THE DRAWINGS

These and other objects and advantages of the invention will be more apparent from the following description and drawings, in which:

FIG. 23 is a flowchart showing the main routine for retrieving fuzzy production rules;

FIGS. 24(a) to 24(e) are charts for explaining the fuzzy production rules;

FIG. 25 is a flowchart showing a subroutine of the flowchart of FIG. 23, for computing a membership value;

FIG. 26 is an explanatory chart showing data stored in a ROM for use in the computation of FIG. 25;

FIGS. 27 and 28 are explanatory charts showing computation tables used in the computation of FIG. 25;

FIG. 30 is an explanatory chart showing a rule matrix stored in a ROM for use in a computation in the procedure of the flowchart of FIG. 29;

FIG. 31 is a chart for explaining the retrieval matrix;

and

Figure 35:
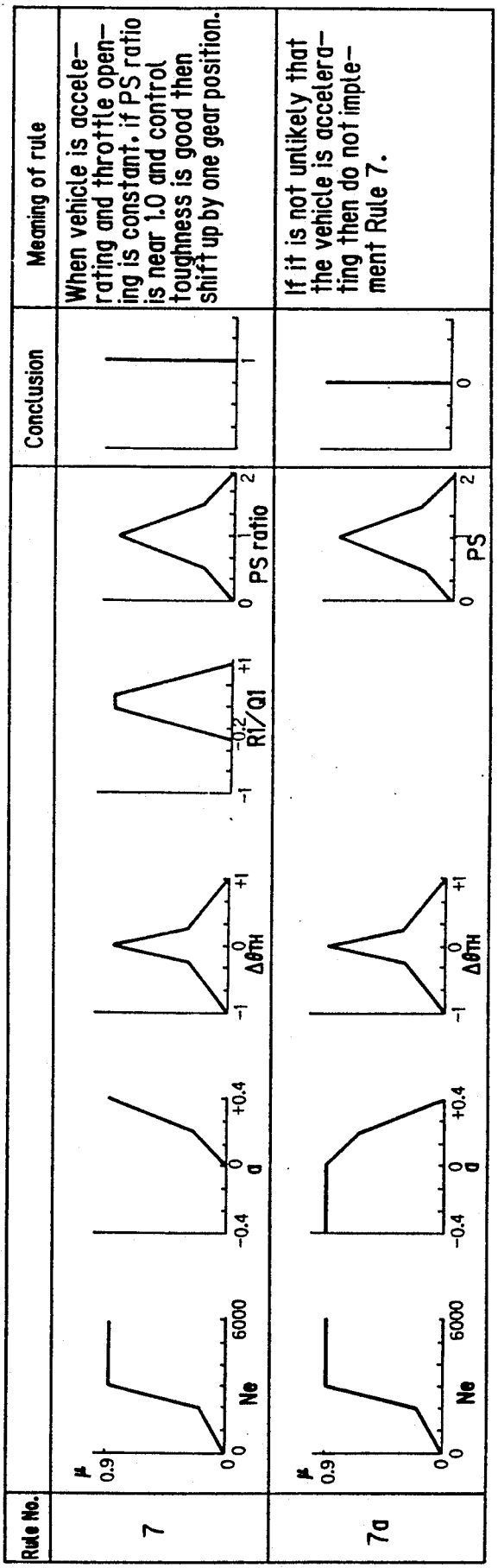

FIG. 35 is an explanatory chart showing examples of fuzzy production rules similar to those in FIG. 24(b), for use in a second embodiment of the invention.

DETAILED DESCRIPTION OF THE PREFERRED EMBODIMENTS

Embodiments of the invention will now be described with reference to the attached drawings.

Figure 1:
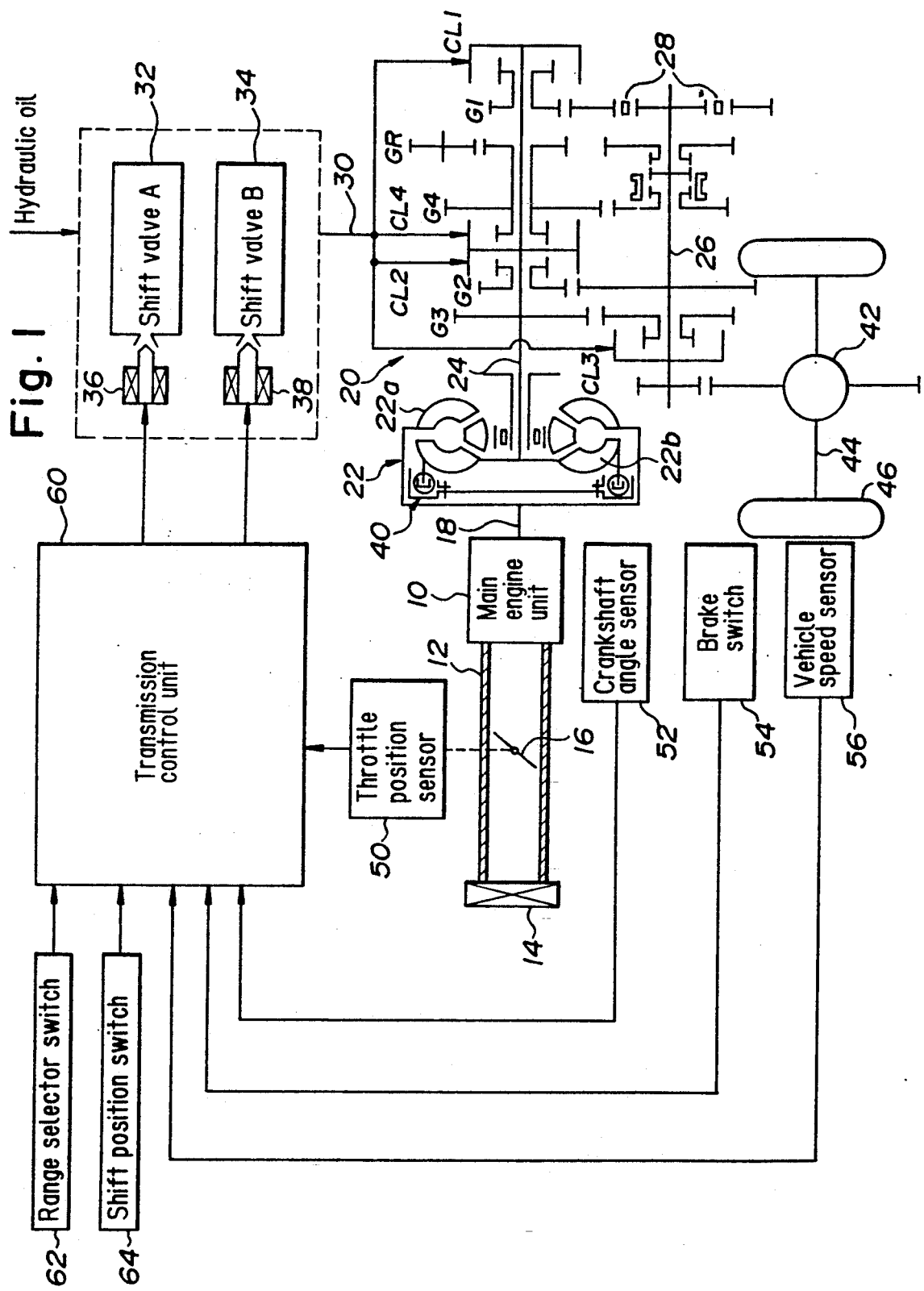
FIG. 1 is a schematic diagram showing the overall arrangement of the vehicle automatic transmission control system according to the present invention.

FIG. 1 is a schematic diagram showing the overall arrangement of the vehicle automatic transmission control system according to the present invention, in which the reference numeral 10 denotes the main unit of an internal combustion engine. The main engine unit 10 is connected with an air intake passage 12 having an air cleaner 14 attached to its far end. The flow rate of the intake air supplied to the main engine unit 10 via the air cleaner 14 and the air intake passage 12 is controlled by a throttle valve 16 linked with and operated by means of an accelerator pedal (not shown) located on the vehicle floor in the vicinity of the driver's seat. A fuel injection valve (not shown) for supplying fuel to the engine is provided at an appropriate position of the air intake passage 12 in the vicinity of the combustion chamber (not shown). The intake air mixed with the fuel enters the combustion chamber and, after being compressed by a piston (not shown), is ignited by a spark plug (not shown). The fuel-air mixture burns explosively and drives the piston. The driving force of the piston is converted into rotating motion which is made available at an engine output shaft 18.

The stage following the main engine unit 10 is a transmission 20. The output shaft 18 is connected with a torque converter 22 of the transmission 20 and is linked with a pump impeller 22a thereof. A turbine runner 22b of the torque converter 22 is connected with a main shaft 24 (the transmission input shaft). A countershaft 26 (the transmission output shaft) is provided in parallel with the main shaft 24 and between the two shafts there are provided a first speed gear G1, a second speed gear G2, a third speed gear G3, a fourth speed gear G4 and a reverse gear GR, and these gears are provided respectively with multi-plate hydraulic clutches CL1, CL2, CL3 and CL4 (the clutch for the reverse gear is omitted from the drawing in the interest of simplicity). The first speed gear G1 is further provided with one-way clutches 28. To these hydraulic clutches is connected a hydraulic line 30 which interconnects a source of hydraulic pressure and a tank (neither shown). A shift valve A 32 and a shift valve B 34 are provided in the hydraulic line 30. The positions of the two switch valves are changed by the energization/deenergization of respective solenoids 36 and 38, whereby the supply/removal of hydraulic pressure to/from the aforesaid clutches is controlled. The torque converter 22 has a lock-up mechanism 40, whereby the turbine runner 22b and the output shaft 18 can be directly connected in accordance with a command from a control unit to be explained later. Moreover, the countershaft 26 is connected with a rear axle 44 through a differential 42. The rear axle 44 has rear wheels 46 at its opposite ends. The main engine unit 10, transmission 20 and differential 42 are mounted on a chassis (not shown) which, in turn, has a frame mounted thereon, thus constituting the vehicle.

In the vicinity of the throttle valve 16 of the air intake passage 12 there is provided a throttle position sensor 50 constituted as a potentiometer or the like for detecting the degree of opening of the throttle valve 16. In the vicinity of a rotating member of the main engine unit 10, e.g. near a distributor thereof, there is provided a crankshaft angle sensor 52 constituted as an electromagnetic pickup or the like. The crankshaft angle sensor 52 detects the position of the piston in terms of the crankshaft angle and produces a signal once every prescribed number of degrees of crankshaft rotation. In the vicinity of a brake pedal (not shown) provided on the vehicle floor in the vicinity of the driver's seat there is provided a brake switch 54 for detecting depression of the brake pedal. At an appropriate location near the transmission 20 there is further provided a vehicle speed sensor 56 constituted as a reed switch or the like for detecting the running road speed of the vehicle. The outputs of the sensors 50, 52, 54 and 56 are sent to a transmission control unit 60. The transmission control unit 60 also receives an output from a range selector switch 62 for detecting the selected position of a range selector and an output from a shift position switch 64 for detecting the selected shift (gear) position.

Figure 2:
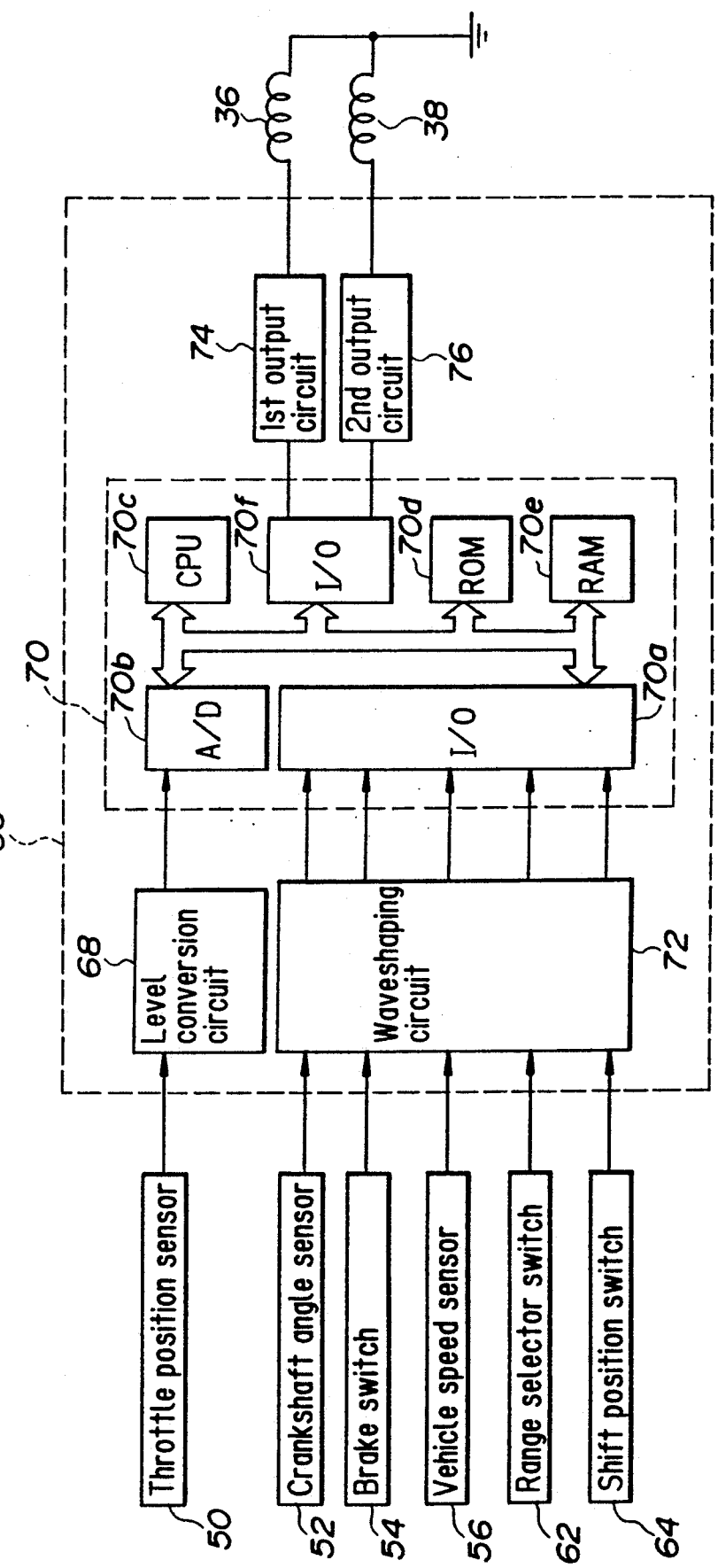
FIG. 2 is a block diagram showing the arrangement of a control unit in the system.

FIG. 2 is a block diagram showing the transmission control unit 60 in detail. As shown in this figure, the output from the throttle position sensor 50 input to the transmission control unit 60 is first sent to a level conversion circuit 68 where it is amplified to an appropriate level and the amplified signal is forwarded to a microcomputer 70. The microcomputer 70 has an input port 70a, an A/D converter 70b, a CPU 70c, a ROM 70d, a RAM 70e, an output port 70f, group of registers and counters (neither shown). The output from the level conversion circuit 68 is input to the A/D converter 70b whereby it is converted into a digital value, and the digital value is temporarily stored in the RAM 70e. The outputs from the crankshaft angle sensor 52 and the like input to the transmission control unit 60 are first waveshaped in a waveshaping circuit 72 and then input to the microcomputer through the input port 70a to be temporarily stored in the RAM 70e. On the basis of these raw measured values and various other computed values derived therefrom, the CPU 70c determine a gearshift command value, as will be explained later. The determined gearshift command value is sent through the output port 70f to a first output circuit 74 and/or a second output circuit 76 which energize/deenergize the solenoids 36 and 38 accordingly so as to shift the transmission 20 or to hold the present gear. This shifting of gears can be conducted, for example, such that the fourth speed gear is engaged when both of the solenoids are deenergized (off). The operation of solenoids to shift a transmission is, however, well known and not being a feature of the present invention, will not be explained here.

The operation of the control system will now be explained with respect to the flowcharts of FIG. 3 and later figures.

Before going into a detailed description, however, the general features of the control system will first be explained. What characterizes the control system according to the present invention is that it is constituted to apply fuzzy logic so as to determine gearshift timing in a manner that resembles determination through human volition. Thus the control system of this invention is not characterized by the structure of the control system itself but by the operation of the control system, that is, by its method of control. Since fuzzy logic has been applied in various fields in recent years, the principles of this kind of control will be discussed only briefly in this specification.

In fuzzy logic control, the state of the subject to be controlled is ascertained in approximate terms and control values are determined on the basis of the approximate ascertainment using rules (called "fuzzy production rules") expressed linguistically in the form "If such and such then do such and such." In the production rules, the condition judgment standards and the content of operations are treated as approximated amounts and are quantified by using membership functions. Hence, the system creates a model of control operations exhibiting high flexibility and adaptability. Thus, since the expression of human knowledge is facilitated, fuzzy logic is well adapted for use with the so-called expert systems which enable the knowledge and judgments of an expert to be incorporated into a computer system. The present control system is based on these principles.

Therefore, in the present control system, tasks such as that of compiling the fuzzy production rules required for application of fuzzy logic have to be carried out at the time of designing the control system for the automatic transmission, and during actual driving the control values are determined on the basis of this control algorithm. More concretely, the process is as follows.

(1) Compiling of fuzzy production rules

As will be explained later, an appropriate number of linguistically expressed rules such as "If the engine speed has become extremely high then shift up one speed gear so as to protect the engine" are created. These rules are compiled by analyzing the judgments and operations of an expert driver of a vehicle with a manually shifted transmission and then selecting from among the rules of experience that can be induced from these judgments and operations.

(2) Setting parameters and membership functions

At the same time, the parameters to be used for ascertaining the state of the subject of control are decided, the parameters (variables) to be used with the respective production rules are selected, and evaluation standards are set by fixing parameter membership functions (the state expressed by a membership function being referred to as a "fuzzy label"). In the present system, as the parameters there are used both the raw values of a physical property detected by the sensors and computed values including estimated values and predicted values obtained as, for example, by differentiating the raw values. Specifically, these parameters are, for example, the engine speed, the degree of throttle opening, the vehicle speed, the throttle opening change, the acceleration and the like. As shown in FIGS. 24(a) to 24(e), a parameter is represented on a horizontal axis (the universe of discourse) and is given an appropriate waveform (the aforesaid membership functions and the vertical axis is assigned values between "0" to "1.0" referred to as "membership values (grades)".

These are the preparatory tasks that have to be carried out at the time of designing the vehicle. In the preparatory stage, it is also necessary to select the sensors for detecting the selected parameters and to store in the memory of the control unit microcomputer the rules and the like as well as processing procedure commands and the like.

(3) Control during running of the vehicle

During running of the vehicle, the CPU 70c of the microcomputer receives (or computes) the parameters, refers to the rules, selects one of the rules through fuzzy reasoning, and after deciding what the result of the control is to be (e.g. shiftup by one gear position), energizes/deenergizes the prescribed one(s) of the solenoids 36 and 38 so as to engage the next higher gear. In this fuzzy reasoning, membership values are computed for the parameters related to each rule and the smallest computed value is defined as the evaluation index for the rule concerned. Then the rule with the largest evaluation index is selected. This type of mini-max processing is widely used in fuzzy reasoning.

The operation of the present control system will now be explained with reference to the flowchart of FIG. 3. The program of this flowchart is restarted at appropriate intervals of, for example, 10 to 40 milliseconds.

Figure 3:
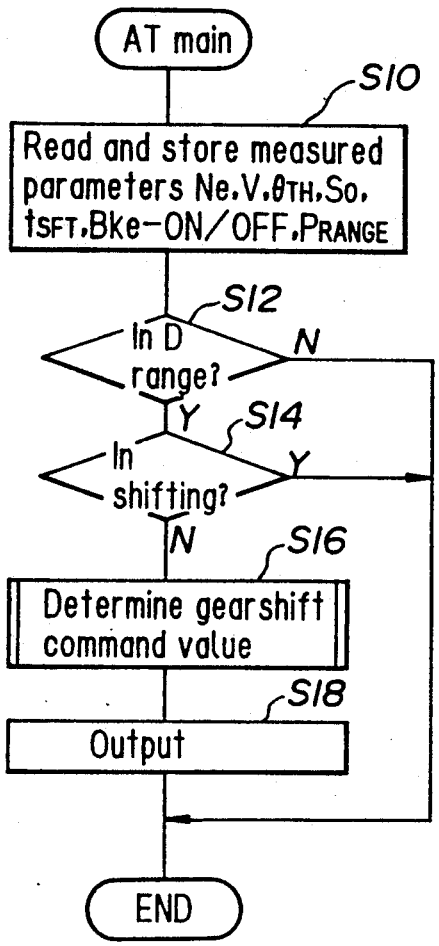
FIG. 3 is a main routine flowchart showing the operation of the control unit.

The flowchart of FIG. 3 shows the main routine for transmission control To begin with, the values being output by the sensors at the start of the program are read and stored in the RAM in step S10. The detected values read at this time are the engine speed Ne(rpm) computed from the number of signals output by the crankshaft angle sensor 52 over a prescribed period of time, the vehicle speed V(km/h), the throttle opening $\theta$TH (degrees), the current gear position signal So computed from the ratio between the rotation speeds of the transmission input and output shafts or from the engine speed, throttle opening, vehicle speed and the like, the time from last shift operation tSFT(sec) (not the output of a sensor but the time measured by the microcomputer time counter; an appropriate flag register is turned on when a shift command is issued by the microcomputer and the time lapse from this turn-on operation is measured), the on/off signal BKe-ON/OFF from the brake switch 54, and the range position signal PRANGE from the switch 62.

The procedure then advances to step S12 where it is determined whether the range selector is in D range and if it is, the procedure advances to step S14 in which it is judged whether or not a shifting operation is in progress. This judgment is made by referring to the aforesaid gearshift command flag. When it is determined in step S14 that a shifting operation is not in progress, the procedure moves to step S16 in which the gearshift command value is set. This operation will be explained below. When the determination is NO in step S12 or YES in step S14, the program procedure is immediately discontinued.

Figure 4:
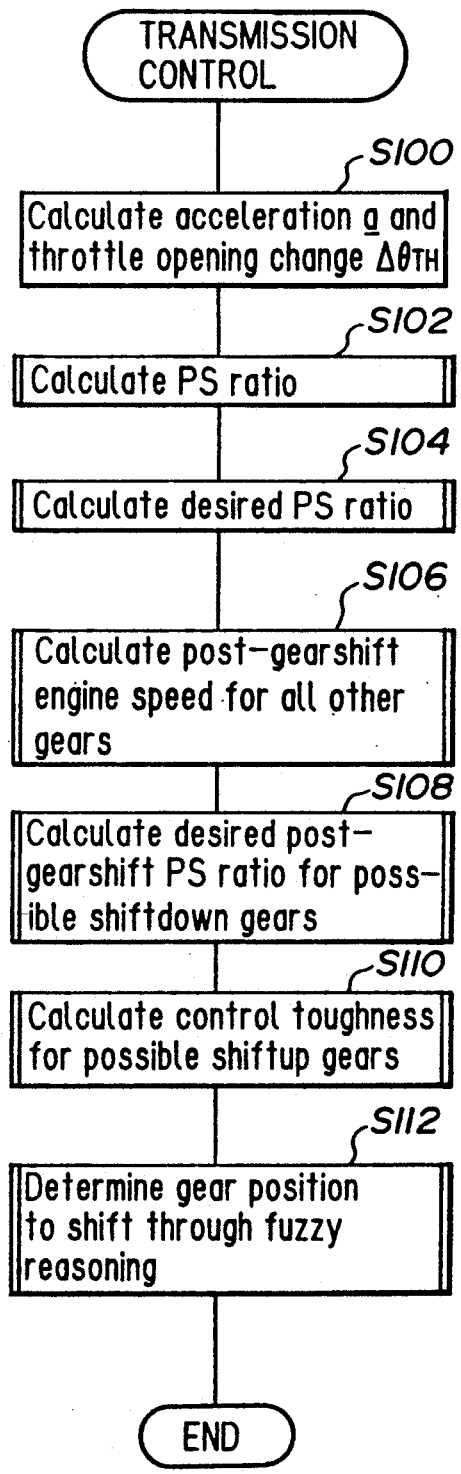
FIG. 4 is a flowchart showing a subroutine of the main routine, for determining a gearshift command value.
Figure 5:
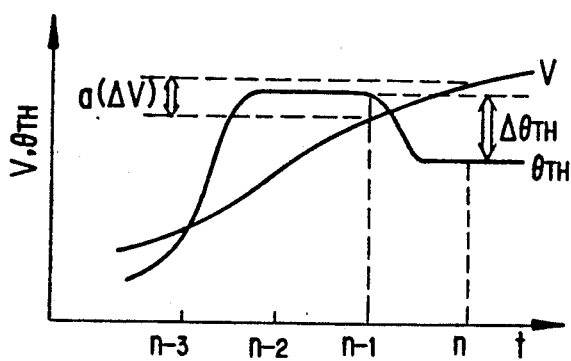
FIG. 5 is a graph for explaining an operation carried out in the subroutine of FIG. 4, for computing the acceleration and the amount of change in throttle opening.

FIG. 4 is a flowchart showing a subroutine for setting the gearshift command value. In step S100 of the subroutine, the vehicle speed V (km/h) and the throttle opening $\theta$TH (degrees) detected at the start of the preceding program cycle are read out and used to compute the acceleration a(km/h/sec.) (speed deviation) and the throttle opening change Delta$\theta$TH (degree/sec.). More specifically, as shown in FIG. 5, a computation is carried out to obtain the deviation between the value at the start of the current program cycle (time n) and the value at the start of the preceding cycle (time n−1) (namely, the first differential derivative over the time n−(n−1)). In actual operation, the acceleration is computed as km/h/0.1 sec. and the throttle opening change as degree/0.1 sec.

In the succeeding step S102 the output desired by the driver is estimated from the throttle opening change Delta$\theta$TH at the current time n and the ratio between the estimated value and the actual output of the vehicle is computed, hereinafter referred to as the "PS ratio". As the units relating to the PS ratio and to the computation parameters referred to below there will be used the horsepower (PS), the motive force (kgf; usually measured by "N", however "kgf" is used in the description.) and the like. It should be noted, however, that it is alternatively possible to further use the torque (kgf m) and the acceleration (km/h/sec.).

Figure 6:
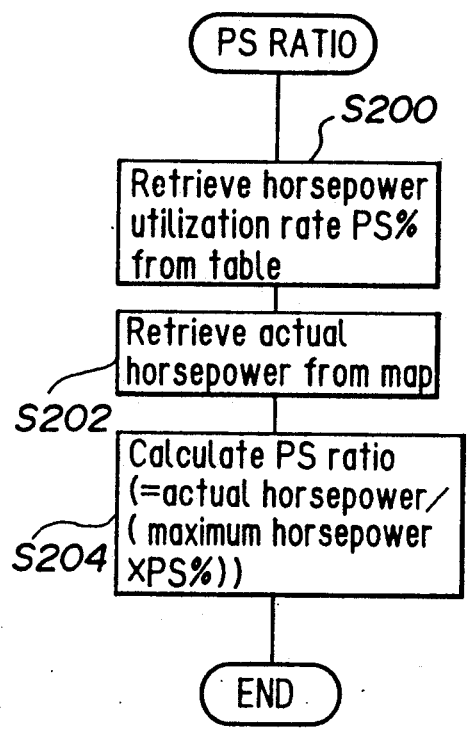
FIG. 6 is a flowchart showing a subroutine of the flowchart of FIG. 4, for computing a PS ratio.
Figure 7:
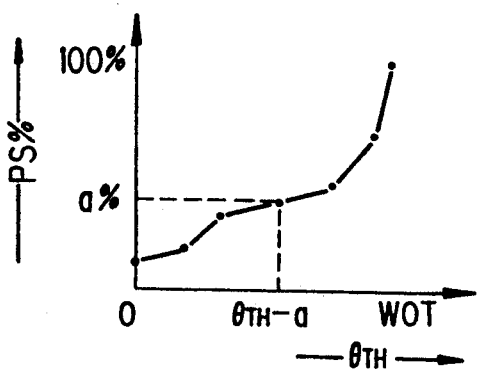
FIG. 7 is a graph for explaining the computation of a PS % in the flowchart of FIG. 6.
Figure 8:
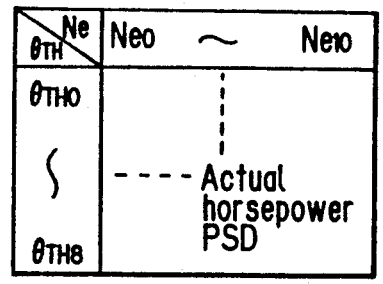
FIG. 8 is a graph for explaining the computation of horsepower output in the flowchart of FIG. 6.

FIGS. 6, 7 and 8 relate to a subroutine for computing the PS ratio. In step S200 of the flowchart of FIG. 6, the throttle opening $\theta$TH is used as address data for retrieving the rate desired by the driver, hereinafter referred to as the horsepower utilization rate PS %, from a table stored in the ROM 70d. This table represents the experimentally determined relationship between the throttle opening $\theta$TH (taken on the horizontal axis in FIG. 7) and the output characteristics. From the characteristics it can be ascertained that, for example, when the throttle has been opened as far as WOT, the driver at this time desires the maximum output the engine is capable of producing, and when the throttle opening $\theta$TH is a, he desires a % of the maximum output of the engine.

In the following step S202, the current throttle opening $\theta$TH and engine speed Ne are used as address data for retrieving the horsepower actually generated by the engine, hereinafter referred to as the "actual horsepower PSD" from a map. The nature of this map will be understood from FIG. 8. This is also prepared in advance on the basis of experiments.

The procedure then advances to step S204 in which the value of the horsepower utilization rate PS% found in step S200 is multiplied by the maximum horsepower i.e. the maximum horsepower which the vehicle is capable of outputting and the actually produced horsepower PSD obtained in the preceding step is divided by the so-obtained product, the result being the aforesaid PS ratio. In other words;

$$PS \text{ ratio} = (\text{actual horsepower retrieved from map})/(\text{horsepower desired by driver})$$

From this it is possible to ascertain what portion of the horsepower desired by the driver is actually being produced by the vehicle. If the PS ratio is near or larger than "1.0" this means that the desire of the driver is adequately met and can be interpreted to show that the driver is strongly motivated to shift up so that the horsepower will start declining. When the PS ratio is smaller than "1.0" this means that the amount of horsepower is not sufficient to satisfy the driver's desire so that it can be interpreted that the driver is weakly motivated to shift up. Thus this PS ratio can be used as a guideline at the time of shifting up.

Returning to FIG. 4, the procedure then moves to step S104 in which the amount of change in horsepower desired by the driver is determined from the throttle opening change Delta$\theta$TH, and the ratio between the desired amount of change and the actual change in horsepower output by the vehicle is calculated, which is hereinafter referred to as a "desired PS ratio EPSRTO". As will be explained later, this desired PS ratio can be used to determine the driver's motivation to shift down.

Figure 9:
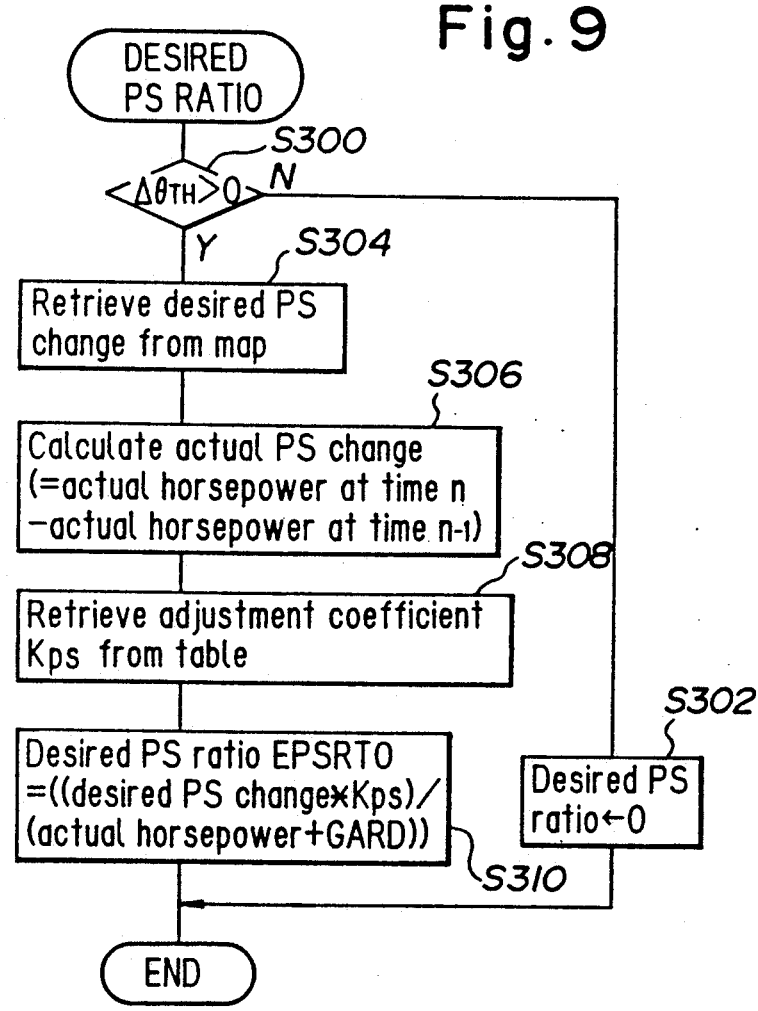
FIG. 9 is a flowchart showing a subroutine of the flowchart of FIG. 4, for computing a desired PS ratio.

FIG. 9 is a subroutine flowchart showing the procedures for computing the desired PS ratio. In the first step S300 of the subroutine it is determined whether or not the value of the throttle opening change Delta$\theta$TH is negative and if it is, since this means that the throttle valve has been returned in the closing direction, the procedure advances to step S302 in which the desired PS ratio is defined as zero. This is because the desired PS ratio is used for deciding whether or not to shift down, and the fact that there has been a reduction in the amount of throttle valve opening indicates that there is no intention on the part of the driver to accelerate (shift down).

Figures 10, 11:
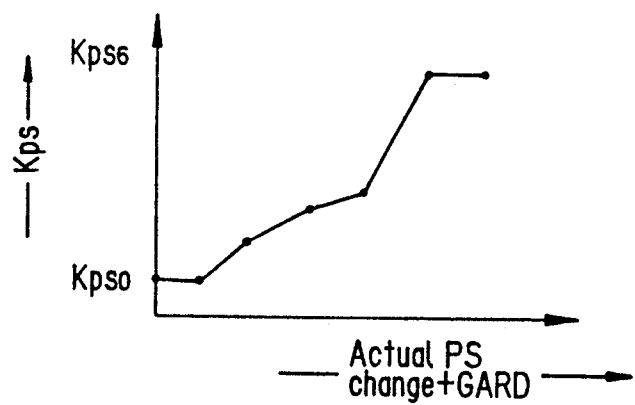
FIG. 10 is a chart for explaining the computation of the desired PS ratio in the flowchart of FIG. 9.
FIG. 11 is a graph for explaining the computation of an adjustment coefficient used in the flowchart of FIG. 9.

When it is found in step S300 that the throttle valve has not been returned in the closing direction, the procedure moves to step S304 in which the throttle opening Delta$\theta$TH$n-1$ detected at the previous cycle (at time $n-1$) and the throttle opening change Delta$\theta$TH occurred in a period between the previous and current (present) cycles are used as address data for retrieving from a map stored in the ROM the amount of change in horsepower desired by the driver, referred to as a "desired PS change DEPS". The map concerned is prepared from experimentally obtained data and then stored in the ROM. The nature thereof will be understood from FIG. 10.

Next in step S306, the actual amount of change in horsepower, referred to as a "actual PS change DLTPSD" is computed as follows;

$$\text{Actual } PS \text{ change} = (\text{actual horsepower retrieved from map at time } n) - (\text{actual horsepower retrieved from map at time } n-1)$$

These actual horsepowers are retrieved from the aforesaid output map shown in FIG. 8 using the throttle opening $\theta$TH and the engine speed Ne as address data. Thus the computation provides the difference between the value retrieved using $\theta$THn and Ne for the time n and $\theta$THn and Ne for the time $n-1$, making it possible to obtain the difference in actual horsepower over the unit time between times $n-1$ and n. Next in step S308, the actual change in horsepower obtained in the preceding step and an appropriately selected constant GARD are used as address data for retrieving an adjustment coefficient KPS from the table shown in FIG. 11 stored in the ROM.

Next, in step S310, the desired PS ratio EPSRTO is obtained as follows;

$$\text{Desired } PS \text{ ratio} = (K_{ps} \times \text{desired horsepower change})/\text{actual horsepower change} + GARD)$$

In this equation, the values Kps and GARD are included to eliminate the inconvenience in computation that would otherwise arise when the horsepower change is zero, as may happen in the low engine speed region.

As described in the foregoing, the desired PS ratio indicates the ratio between the change in the horsepower actually being output by the vehicle and the change in horsepower desired by the driver, and this ratio is used for judging the motivation of the driver to shift down. Specifically, the judgment is;

| Desired PS ratio < 1.0 | Weak motivation to shift down |
|---|---|
| Desired PS ratio 1.0 | Strong motivation to shift down |

In other words, the fact that the desired PS ratio is 1.0 or larger means that the driver desires a large amount of horsepower which the vehicle is unable to supply so that it is necessary to shift down so as to increase the driving force. On the other hand, the fact that this ratio is less than 1.0 means the vehicle is able to respond to the driver's desire so that there is no need to shift down. Thus the PS ratio described earlier for use in deciding whether or not to carry out a shiftup operation is not used for deciding whether to carry out a shiftdown operation but instead there is established a separate desired PS ratio for the shiftdown decision. The reason for this is that the PS ratio for judging the motivation of the driver to shift up is computed from the throttle opening, while it was thought more appropriate to judge the motivation of the driver to shift down not from the throttle opening but from the change therein.

Returning to FIG. 4, in the following step S106 the engine speeds which would result from shifting up or down from the present gear position to all other gear positions are computed. The engine speed following a shift operation will be referred to as the "post-gearshift engine speed."

Figures 12, 13:
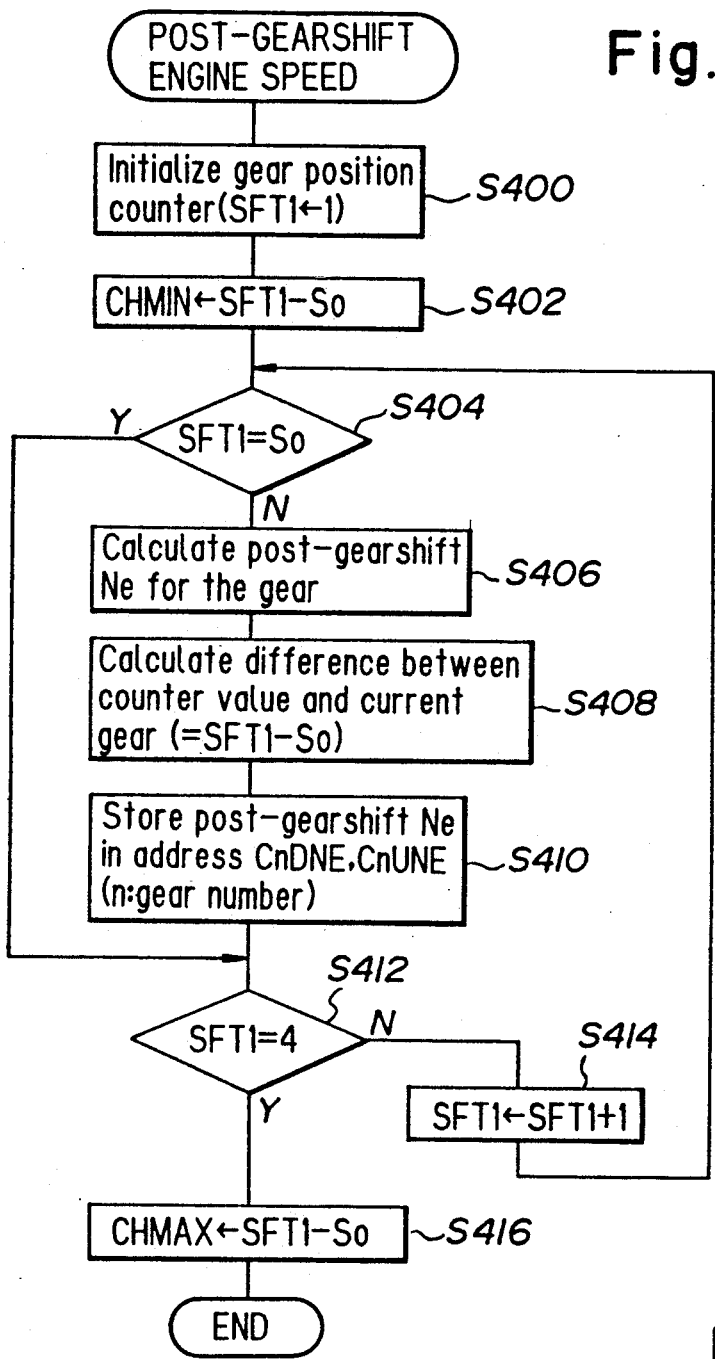
FIG. 12 is a flowchart showing a subroutine of the flowchart of FIG. 4, for computing a post-gearshift engine speed.
FIG. 13 is an explanatory chart showing an example of the computation in the flowchart of FIG. 12.

The computation procedure for this purpose is shown in FIG. 12. In the first step S400 of this subroutine a counter SFT1 which successively indicates the gear positions to which it is possible to shift is initialize to the initial value of "1". The post-gearshift engine speed is not determined only for a single, specific gear position but for all gear positions to which it is possible to shift from the current gear position So. In the present embodiment which relates to a vehicle with 4 speeds forward, the post-gearshift engine speed is thus found separately for each of the remaining three gear positions. The counter SFT1 is thus used to indicate the gear position with respect to which the computation is currently in progress, and the counter is initialize to SFT1 = 1 in this step meaning that the gear to be shifted into is set first to the first gear position.

Next, in step S402, the first gear position (counter value SFT1) and the current gear position So are compared and the maximum number of gear positions it is possible to shift down (CHMIN) is computed. As shown in the example computation in FIG. 13, this means that, for example, if the current gear position is the 3rd, it is possible to shift down by two gear positions.

The procedure then moves to step S404 in which it is determined whether or not the current gear position is the first and if it is not, the procedure moves to step S406 where the post-gearshift engine speed is computed for the case where the transmission is shifted to the 1st gear, as follows;

Post-gearshift engine speed = (overall gear ratio GR of the 1st gear/(overall gear ratio of current position)(rpm)

The overall reduction ratio for each gear position is stored in the ROM in advance.

Next, in step S408 the difference between the 1st gear (the counter value) and the current gear position is computed to obtain the number of gear positions, shift steps, and in step S410 the post-gearshift engine speed is stored in the RAM in the column for the gear position concerned. In this case, as shown in FIG. 13, the values for lower gear position numbers are stored as CnDNE and those for higher gear position numbers are stored as CnUNE (n: gear;) therefore in the current case n = 1).

In the succeeding step S412 it is determined whether or not the counter value SFT1 has reached "4", i.e. whether the top gear has been reached. Since the computation is started from the 4th gear, the top gear is of course not reached in the first cycle following startup. Thus in step S414 the counter value is incremented and the post-gearshift engine speed is computed for the second and higher gears excluding the current gear position. Then when it has been confirmed that the top gear has been reached, the procedure moves to step S416 in which the number of gear positions between the current gear position and the top gear is computed, the result being defined as the maximum number of gear positions it is possible to shift up (CHMAN).

Returning to the flowchart of FIG. 4, the procedure next moves to step S108 in which the ratio between the change in horsepower desired by the driver and the change in actual horsepower expected after the shift-down operation, referred to as the desired post-gearshift PS ratio CnDPSR, is computed. To explain, in the system of the present invention, the amount of change in horsepower desired by the driver is estimated from the driver's operation of the throttle, the desired change is compared with actual change in horsepower output by the vehicle, and the decision as to whether or not to shift down is made depending on whether or not the change desired by the driver has been realized. This comparison corresponds to finding the aforesaid desired PS ratio. Moreover, when the decision is that it is necessary to shift down, the index used as the basis for deciding which gear position to shift to is the desired post-gearshift PS ratio calculated in step S108. In other words, the desired post-gearshift PS ratio indicates what gear position must be shifted down to in order to realize the change in horsepower desired by the driver.

In the case of a shiftup operation, on the other hand, the horsepower desired by the driver is estimated from the current throttle opening and the shiftup decision is made on the basis of a comparison between this estimated horsepower and the actual horsepower being output by the vehicle, i.e. the aforesaid PS ratio. At the same time, in order to avoid a shiftup operation which would result in an extreme decrease in the reserve horsepower and an accompanying loss of vehicle operability, there is introduced into the system a concept, so-called "control toughness", for which purpose there is established a coefficient indicating the appropriateness of vehicle response to change in the throttle opening. The control toughness concept will be discussed later. In the system according to this invention, fuzzy logic is used in conjunction with the various indices and parameters including the concept for judging the degree of satisfaction of fuzzy production rules and determining control command values.

Figure 14:
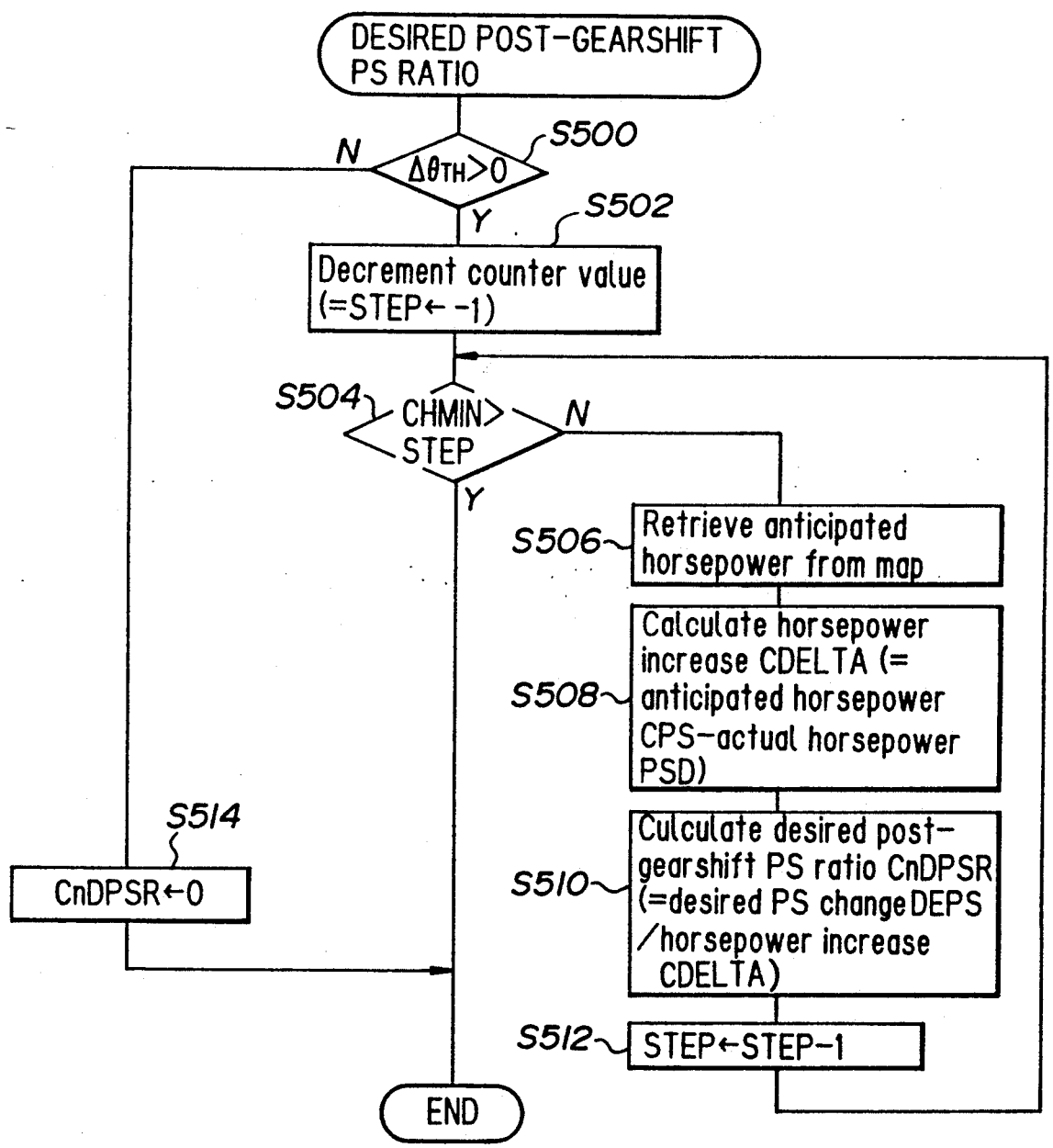
FIG. 14 is a flowchart showing a subroutine of the flowchart of FIG. 4, for computing a desired post-gearshift PS ratio.

The desired post-gearshift PS ratio will now be explained with reference to the flowchart of FIG. 14.

First, in step S500, similarly to what was explained earlier in connection with the desired PS ratio, it is confirmed whether or not the throttle valve has moved in the closing direction, the fact that it has not being taken as an indication that the driver at least has no intention of shifting down. If it is found that there has been no closing of the throttle valve, the procedure then moves to step S502 in which a counter STEP which has stored the value obtained in S408 of the flowchart of FIG. 12 and indicating the number of gear positions is decremented by one. This value is set on the assumption of a one gear position shiftdown.

The procedure then advances to step S504 in which, similarly, it is judged whether or not the aforesaid gear position one speed shifted down exceeds the maximum number of gear positions it is possible to shift down (CHMIN) obtained in step S402 of the flowchart of FIG. 12. When it exceeds the value CHMIN, as for example when the current gear position is the first and it is impossible to shift down one gear position, the computation is immediately discontinued since it is meaningless. On the other hand, when it does not exceed the value CHMIN and it is thus possible to shift down, the procedure moves to step S506 in which the post-gearshift engine speed and the current throttle opening are used as address data for retrieving from the aforesaid PS map of FIG. 8 the horsepower CPS that would be output if the transmission should be shifted down by one gear position. In this case, for the post-gearshift engine speed there is used the value C1DNE for one gear position lower which was stored in the RAM as the down-side value when data was stored in step S410 of the flowchart of FIG. 12.

In the following step S508, the horsepower increase CDELTA resulting from the shifting operation is computed by subtracting the anticipated horsepower CPS from the current horsepower PSD (computed in the flowchart of FIG. 6) and then in the following step S510, the desired post-gearshift PS ratio CnDPSR (n being the number of gear positions shifted down) is computed as follows;

Desired post-gearshift *PS* ratio = desired change/(horsepower increase by shifting + *GARD*)

where the desired PS change DEPS computed in the flowchart of FIG. 9 is used and the horsepower increase is a value just calculated at the preceding step (S506). The value GARD is a constant to prevent division by zero.

The procedure then advances to step S512 in which the value of the counter for indicating the number of gear positions is decremented, whereafter the foregoing operations are repeated until it is judged in step S504 that the maximum number of shiftdowns possible has been reached. When it is found in step S500 that the throttle valve is being closed, the desired post-gearshift ratio is set to zero in step S514 and the procedure is ended.

Figure 15:
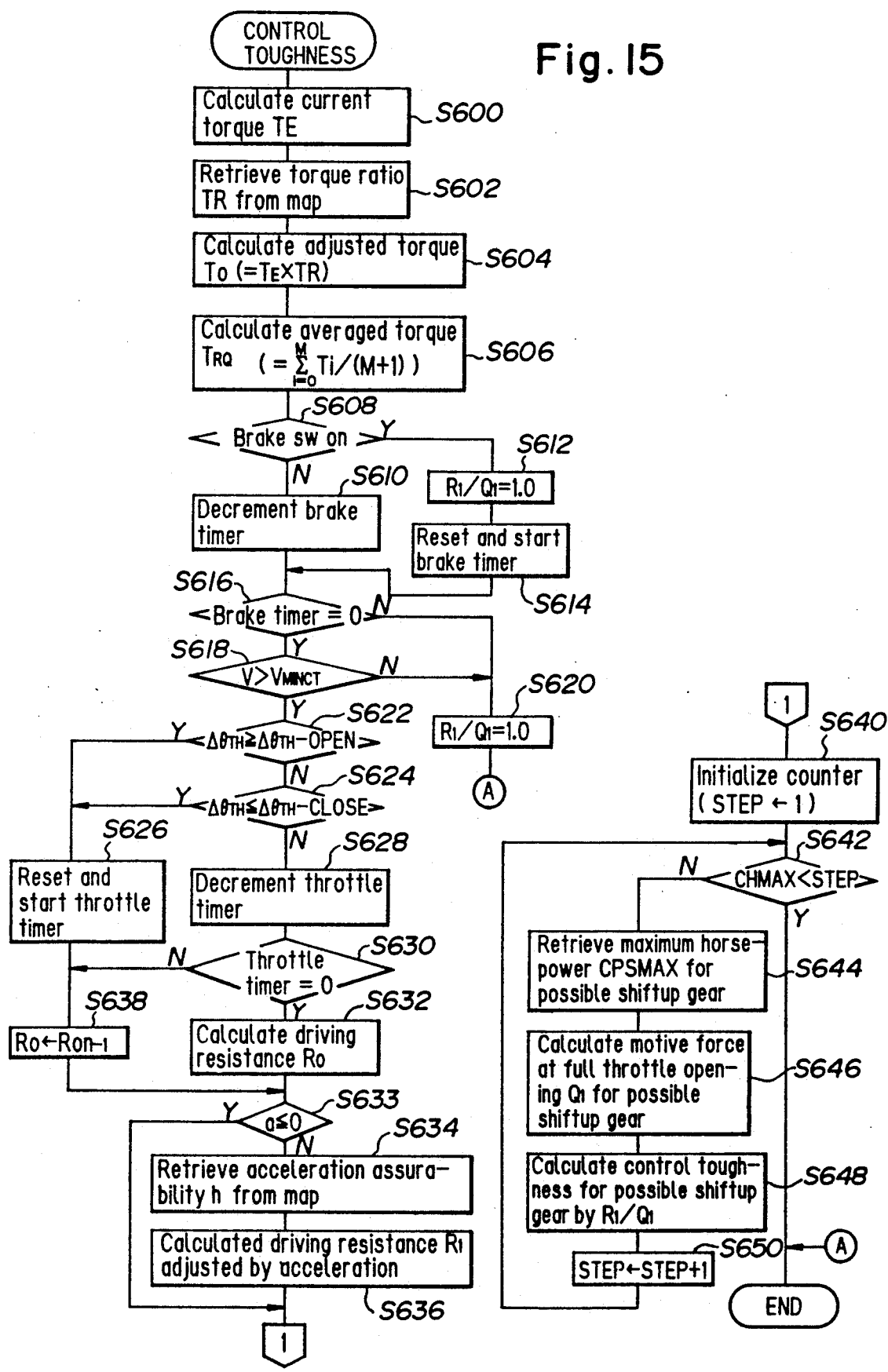
FIG. 15 is a flowchart showing a subroutine of the flowchart in FIG. 4, for computing a control toughness.

Returning to FIG. 4, the procedure next moves to step S110 in which the control toughness is computed. FIG. 15 is a flowchart showing a subroutine for carrying out this computation.

Figure 16:
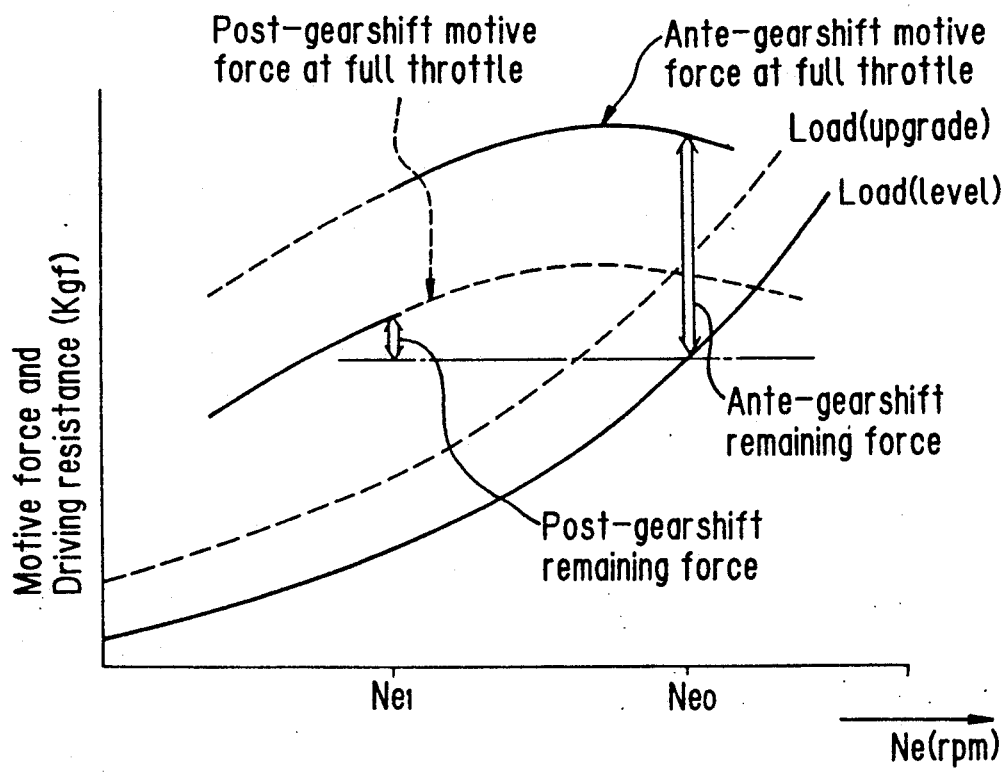
FIG. 16 is a graph showing vehicle dynamics for explaining the basis of the control toughness.

Before going into the details of this flowchart, however, a general explanation of the control toughness concept will first be made with respect to FIG. 16. The term has been coined by the inventors and means a "coefficient indicating appropriateness of vehicle response to change in throttle opening". The idea of control toughness was conceived in part for the purpose of eliminating the earlier mentioned busy feeling that the driver experiences because of the frequent shifting operations which occur when the vehicle is climbing a hill, pulling a camper or the like. This problem arises because an insufficiency in reserve force results after the driving resistance attributable to the external load on the vehicle is subtracted from the motive force, and the decrease in the remaining force is most pronounced at the time of shiftup when the motive force itself decreases. This will be explained with reference to FIG. 17. This graphically shows the remaining force as an amount corresponding to the difference between the current driving resistance and the motive force at full throttle opening, assuming the current engine speed of the running vehicle to be at a speed Ne0. During hill climbing, since the driving resistance also includes the resistance component due to the grade of the hill being climbed, it is higher than at the time of level-ground running. Thus in the conventional system in which the gearshift point is determined solely on the basis of the vehicle speed and the throttle opening, return of the throttle opening to that for cruising while the vehicle is running up hill would result in a shiftup operation, which would cause a reduction in engine speed to a lower speed Ne1 and an accompanying drop in the motive force at full throttle opening, i.e. the post-gearshift motive force. Thus, as shown in the figure, the amount corresponding to the post-gearshift remaining force would decrease, with the result that the transmission would be shifted back down. That is to say, in such a case the vehicle would be unable to respond appropriately to the desire of the driver because the driving resistance is large in comparison to the amount with respect to the post-gearshift remaining force. If it should be possible to take these circumstances into consideration at the instant of judging whether or not to shift up, it would thus be possible to avoid conducting meaningless shiftup operations. In the system according to this invention, therefore, the appropriateness of the vehicle response is viewed in terms of the relationship between the post-gearshift motive force and the driving resistance and expressed as the control toughness, and judgment regarding shiftup is made with consideration being given to the control toughness. More precisely, the shiftup timing is determined in the manner described earlier by using the PS ratio to compare the horsepower desired by the driver with the actual horsepower, while the final decision as to whether or not to actually conduct the shiftup operation is made with reference to the post-shiftup vehicle operability as determined from the control toughness.

An explanation will now be made with respect to the computation of the control toughness.

First, in step S600 of the flowchart of FIG. 15, the current torque TE is calculated as;

Current torque *TE* = (716.2 × actual horsepower)/(engine speed)(*kgf · m*)

where the value 716.2 is the constant conventionally used for converting horsepower to torque.

Figure 17:
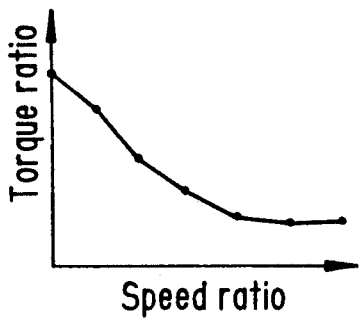
FIG. 17 is a graph for explaining a torque ratio used in the flowchart of FIG. 15.

The procedure then moves to step S600 where the torque ratio TR is retrieved from a torque ratio map stored in the ROM. The torque ratio TR is required since the torque input to the automatic transmission is amplified by the torque converter 22 and it is thus necessary to compute the amount of amplification and adjust the torque accordingly. An explanatory graph relating to the torque ratio map is shown in FIG. 17, in which the speed ratio is represented on the abscissa and the torque ratio is represented on the ordinate. Here the speed ratio is the ratio between the rotational speeds of the main shaft 24 and the countershaft 26. In the actual computation, the engine speed is used for the rotational speed of the main shaft 24 and the vehicle speed for that of the countershaft 26. The procedure then advances to step S604 in which the computed torque ratio TR is multiplied by the torque TE to obtained the adjusted torque T0.

Figure 18:
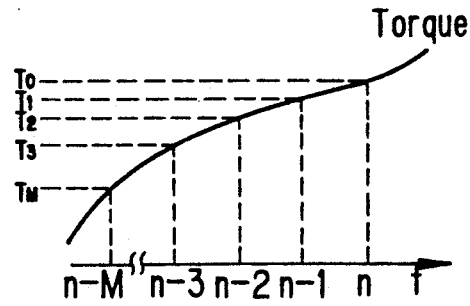
FIG. 18 is a graph for explaining a mean torque computed in the flowchart of FIG. 15.

Next, in step S606, the values of the adjusted torque computed over a prescribed number of cycles up to and including the current cycle are averaged. This operation is carried out because there is some delay between the time that a change in throttle opening occurs and the time that this change is reflected in the engine output and it is thus possible to carry out a more accurate computation if the engine output is ascertained as the total output over a prescribed period of time and then averaged. The graph of FIG. 18 is for explaining this averaging computation. The torque from the current time n (time of the current control cycle) back over a prescribed number of cycles to the cycle which began at time n−M is summed and the sum is then divided by the number of cycles included in the sum. The averaged torque is labeled as TRQ.

The procedure then advances to step S608 in which it is determined from the detection signal from the brake switch 54 whether or not the brake pedal is depressed and if the determination is NO the procedure then moves to step S610 in which a brake timer is decremented. This operation is carried out because the effect of braking is identical with that of applying additional load or driving resistance to the vehicle and it would otherwise be difficult to compute the control toughness accurately since this value is computed from the ratio between the motive force and the driving resistance. Therefore, when it is found that braking is in progress, the procedure moves to step S612 in which the control toughness R1/Q1 is set to "1.0" and the arrangement is such that the rule selected through fuzzy reasoning will not result in the issuance of a shiftup command. Here the term R1 is the driving resistance at the current time and the term Q1 is the motive force at full throttle opening that would be obtained should a gearshift operation be carried out. It should be noted that, however, since the driving resistance is the same before and after the shifting operation, the value R1 could also mean the driving resistance after the shifting operation. Moreover, in accordance with this flowchart, the computation of the control toughness is avoided not only while braking is in progress but also during a prescribed period after braking has been discontinued and the brake pedal has returned to its undepressed state. This ensures the accuracy of the computation even more positively. This is realized by starting a brake timer incorporated in the aforesaid microcomputer in step S614 when it is found in step S608 that braking is in progress and, in parallel with this, decrementing the counter value in step S610 each time that discontinuance of braking is confirmed in step S608. Further, the counter is reset in step S614 when, in step S608, it is detected that braking has been started again in the course of the aforesaid procedure. Needless to say, it may be alternatively possible to use a torque sensor and detect the torque simply.

Then in the following step S616, when it is found that the brake timer value has become zero, the procedure advances to step S618 in which it is determined whether or not the vehicle speed V is greater than a prescribed minimum VMINCT of, for example, 2 km/h. This operation is carried out because it is meaningless to carry out a gearshift operation at a vehicle speed less than this minimum. If it is found that the vehicle speed V does not exceed the minimum vehicle speed VMINCT, the control toughness is set at "1.0" and the program is ended.

Figure 19:
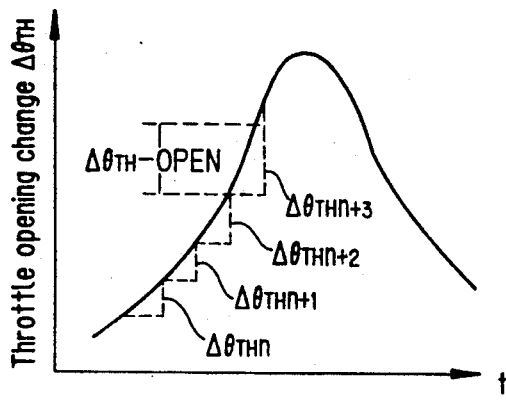
FIG. 19 is a graph for showing a change of throttle opening.

On the other hand, if the vehicle speed exceeds the minimum, the procedure moves to step S622 in which it is determined whether the rate of throttle opening change Delta$\theta$TH is greater than a prescribed rate of throttle opening Delta$\theta$TH-OPEN, as shown in FIG. 19. If the determination is NO, the procedure goes to step S624 in which it is determined whether the rate of throttle opening change Delta$\theta$TH is greater than a prescribed rate of throttle closing Delta$\theta$TH-CLOSE. These operations are carried out because a rapid change in the throttle opening is indicative of a rapidly transient state, and during a rapidly transient state, particularly during rapid acceleration, it takes a certain amount of time after the throttle is opened for the increased amount of fuel to pass through the manifold and into the respective pistons and thus cause an increase in engine output. In view of this time delay, computation of driving resistance RO is discontinued during any period of rapid change in throttle opening and for a prescribed period thereafter. Specifically, when it is found in step S622 or step S624 that the throttle opening is changing rapidly, the procedure goes to step S626 in which reset/start of a throttle timer is conducted, while in step S628 the timer value is decremented each time that it is detected in step S624 that the rapid change in throttle opening has halted.

The procedure then advances to step S630 in which it is determined whether or not the timer value has reached zero and if it has, the procedure moves to step S632 in which the current driving resistance RO is computed as;

$$\text{Driving resistance } RO = [(\text{average torque} \times \text{transmission efficiency } Eta \times \text{overall gear ratio } GR)/(\text{effective tire radius } r)] - [(1 + \text{equivalent mass coefficient}) \times (\text{vehicle weight } M \times \text{acceleration } a)][kgf] \quad (1)$$

The transmission efficiency Eta overall gear ratio GR and vehicle weight M (ideal value) are obtained and stored in the ROM in advance, while as the torque TRQ and the acceleration a there are used, respectively, the value computed in step S606 and the value computed in step S100 of the flowchart of FIG. 4.

The reason for computing the driving resistance in the foregoing manner will now be explained.

The vehicle dynamics can be found through simultaneous equations resulting from the law of motion as follows;

$$\text{Motive force } F - \text{driving resistance } R = \text{vehicle weight } M \times \text{acceleration a } [kgf] \quad (2)$$

wherein
F=(torque TRQ×gear ratio GR×efficiency Eta)/(effective tire radius r) [kgf]
R=(rolling resistance R0+grade sin $\theta$)×vehicle weight Wr+aerodynamic drag (RA×V$^2$) [kgf]

The variables in the foregoing equations are the vehicle weight Wr, which varies with the number of passengers and the size of the cargo, and the grade sin $\theta$, which differs depending on the inclination of the road surface, and all of these factors are included in the driving resistance R. Therefore, by rewriting the aforesaid equation (2), there is obtained;

$$\text{Driving resistance } R = \text{motive force } F - (\text{vehicle weight } M \times \text{acceleration a}) [kgf]$$

Equation (1) is based on this.

The procedure then goes to step S633 in which it is determined whether or not the acceleration a is negative and if it is not, the procedure advances to step S634 in which an acceleration assurability h is retrieved from map. Then in the following step S636 the aforesaid driving resistance R0 is adjusted as shown below to obtain an adjusted driving resistance R1.

$$\text{Adjusted driving resistance } R1 = R0 + (\text{acceleration assurability } h \times \text{vehicle weight } M \times \text{acceleration } a) \times \text{SIGN } (R0) [kgf]$$

Figure 20:
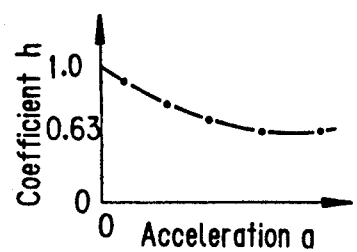
FIG. 20 is a graph for explaining an acceleration adjustment.
Figure 21:
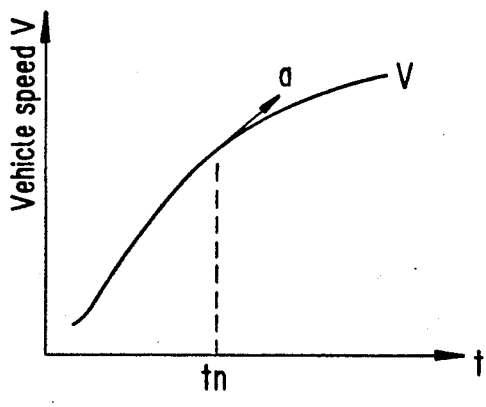
FIG. 21 is a graph for explaining the basis of the adjustment.

This acceleration adjustment will now be explained, first with reference to FIG. 20 which shows the aforesaid acceleration assurability map. In this figure, the acceleration a is represented on the horizontal axis and the acceleration assurability (adjustment coefficient) represented on the vertical axis, for example, is set to decrease with increasing acceleration. In this connection, consider the graph shown in FIG. 21. Assume that the vehicle speed V is currently as shown in this graph and a decision is made to shift up at time tn. Assume also that in the control toughness applied in making the decision was R0/Q1. In these circumstances, since the value R0 lacks the motive force component necessary for maintaining the state of acceleration, it represents only the remaining force required for maintaining the current vehicle speed. It is therefore inappropriate as an index. On the other hand, if the full amount of the motive force required for maintaining the state of acceleration should be added to the value R0 to obtain the adjusted value R1 and the control toughness should be based on the value R1/Q1, then in view of the fact that the motive force is certain to decrease when the gear ratio and engine speed decrease with shiftup, the adjusted value R1 would become larger than the force Q1 (R1>Q1) during rapid acceleration and shiftup would rarely occur. This is an unnatural result from the standpoint of normal driving experience. A driver naturally anticipates a decrease in acceleration following a shiftup operation and it is therefore necessary to somehow express his anticipation and make adjustment accordingly. Here, regarding the flowchart of FIG. 15, it should be noted that when it is found that the throttle opening is changing rapidly, the value of the driving resistance R0n−1 computed in the preceding cycle is used as the value of R0 (step S638). Further, no adjustment is made when the acceleration is negative (step S633).

After execution of step S636, the procedure advances to step S640 in which the value of the aforesaid gear position counter is initialized and then to step S642 in which steps S644 through S650 for computing the post-gearshift motive force at full throttle opening Q1 for each of the gear positions to which it is possible to shift up are repeated until the highest shiftup gear position has been reached More specifically, the first time that the steps S644 through S650 are executed, i.e. when the counter value STEP=1, the presumption is that the shiftup operation will be by one gear position and, in step S644, the maximum horsepower CPSMAX for the next highest gear position is retrieved from the map of FIG. 8 using as address data the post-gearshift engine speed CnUNE computed in the flowchart of FIG. 12 and the full throttle opening value.

Then, in the following step S646, the motive force at full throttle opening Q1 is computed as follows;

Motive force at full throttle opening $Q1 = (716.2 \times$ post-gearshift horsepower at full throttle opening $CPSMAX \times$ overall gear ratio $GR \times$ post-gearshift gear transmission efficiency $Eta)/(\text{post} - \text{gearshift engine speed}$ $CnUNE \times$ effective tire radius $r$) [kgf]

The procedure then advances to step S648 in which the control toughness C1UCT for the case of shifting up by one gear position is computed by dividing the motive force Q1 by the driving resistance R1. The counter value is then decremented in the following step S650 and the procedure returns to step S642 which repeats the aforesaid procedure for a shiftup of two gear positions and a shiftup of three gear positions to obtain the control toughnesses C2UCT and C3UCT. As will be understood from the foregoing, the control toughness indicates what proportion of the maximum motive force would be consumed by the driving resistance at a gear position n higher than the current one and thus indicates the post-gearshift remaining force. It can therefore be understood as a coefficient indicating how appropriately the vehicle is capable of responding to the driver's intention to shift gears.

Figure 22:
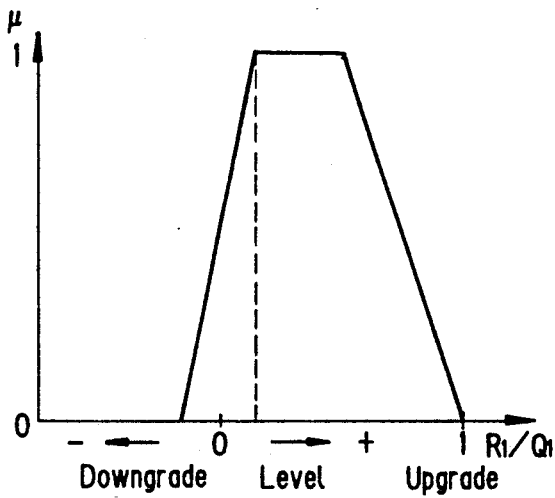
FIG. 22 is a graph for explaining a membership function of the control toughness.

FIG. 22 is a graph for explaining the control toughness when it is defined as a membership function. With reference to this graph, when the value R1/Q1 is near or larger than one, this means that there is no reserve force. In such a case, since shifting up would result in insufficient force, the evaluation value (grade) Mu is low. On the other hand, when the value R1/Q1 is negative, this means that the value M×a is large and that the vehicle is running down hill so that the controllability of the vehicle is again low. Therefore, in the illustrated example, shiftup can be conducted within the range of about 0.2–0.5 while still maintaining adequate reserve force. As will be explained later, in the system according to the present invention, gearshift command values are determined by using fuzzy reasoning to evaluate the degree to which the control toughness and the like agree with gearshift rules such as: "If the control toughness is good then shift up one gear position."

Returning again to FIG. 4, after the control toughness has been computed in step S110, the procedure advances to step S112 in which the gear position into which to shift into is determined through fuzzy reasoning.

FIG. 23 is a flowchart showing the main routine for retrieving the fuzzy production rules. Before discussing this flowchart, however, a brief explanation will first be given with reference to FIGS. 24(a) to 24(e) of the rules used in the system according to this invention. Here it should be noted that, as mentioned earlier, these rules, the parameters they use and the fuzzy labels therefore are established at the time of designing the vehicle control system. As shown in the figures, the present embodiment of the invention employs 20 rules.

| Rule 1 | |
|---|---|
| Parameter used | Engine speed Ne [rpm; hereinafter the same] |
| Conclusion | Shift up one gear |
| Meaning of rule | "If engine speed has become extremely high then shift up one gear speed so as to protect engine." |

This rule is for protecting the engine. It means that when the engine speed has or is liable to enter the red zone above 6000 rpm, the transmission should be shifted up one gear position in order to reduce the engine speed and protect the engine.

| Rule 2 | |
|---|---|
| Parameters used | Current gear position So |
| | Vehicle speed V [km/h; hereinafter the same] |
| | Throttle opening θTH [WOT/8 degrees; hereinafter the same. WOT = 84 degrees] |
| Conclusion | Shift down to the 1st gear |

| Rule 2 | |
|---|---|
| Meaning of rule | "If throttle is fully closed, vehicle speed is very low and current gear position is the top then shift down to the 1st gear." |

This and the next two rules (Rules 3 and 4) are for issuing a command to shift down to the 1st gear in the case where the throttle is completely closed and the vehicle speed is very low, namely for putting the vehicle in its initial operating state. This rule is for the case where the current gear position is the top, while Rules 3 and 4 are for the cases where the current gear position is the 2nd and 3rd, respectively.

While the manner in which a given rule is evaluated by fuzzy reasoning will be explained in detail later with reference to FIG. 23, a simple explanation will be given here to facilitate understanding of the reasoning. Presume that the current gear position is the 2nd, that the vehicle speed is 10 km/h and the throttle opening is ⅛ degrees. Then in the case of Rule 2, as seen from FIG. 24(a), the grades as expressed in fuzzy labels are: current gear position='0' (since a line drawn vertically up from the 2nd gear position does not intersect the wave, the grade is zero); vehicle speed=0.95; and throttle opening=0.95. In the present case, three fuzzy labels are involved and each has a different grade. However, since smallest evaluation value satisfies everything concerned at least within the scope of the rule concerned, the lowest evaluation value, in this case the gear position evaluation value 0 is taken as the evaluation value of Rule 2. This type of evaluation is carried out successively for all twenty rules and the rule with the largest evaluation value is selected as the one being most fully satisfied and this rule is used as the basis for determining the gearshift command value. In the example at hand, the grades with regard to Rule 3 are: current gear position=0; vehicle speed=0.95; and throttle opening=0.95. Thus, the evaluation value of Rule 3 is also zero. As regards Rule 4, the grades are: current gear position=0.95; vehicle speed=0.95; and throttle opening=0.95. Thus, if the existence of the other rules is ignored (i.e. if Rules 2, 3 and 4 are assumed to be the only rules that exist), the decision would be to shift from the 2nd gear to the 1st gear in accordance with Rule 4. The reason that Rule 4 was selected from among the similar Rules 2 to 4 was, needless to say, because the current operating condition was most similar to those described in the rule. In the present embodiment, the maximum values set for the membership functions differ from one rule to another. Specifically, in Rule 1 the maximum value is 1.0, while in Rules 2 to 6 it is 0.95 and in Rules 7 to 20 it is 0.9. The reason for this will be explained later.

The remaining rules will now be explained.

| Rule 5 | |
|---|---|
| Parameters used | Current gear position So<br>Vehicle speed V<br>Throttle opening $\theta$TH |
| Conclusion | Shift down to the 2nd gear |
| Meaning of rule | "If throttle is fully closed, vehicle speed is low and current gear position is the top then shift down to the 2nd." |

This rule is similar to Rules 2 to 4, and prescribes that when the vehicle speed is slow (but not very slow), the transmission should be shifted to the 2nd gear. Rule 6 is identical to Rule 5, except that it relates to the case where the present gear position is the 3rd.

| Rule 7 | |
|---|---|
| Parameters used | Engine speed Ne<br>Acceleration $a$ [km/h/0.1 sec.; hereinafter the same]<br>Throttle opening change Delta$\theta$TH [degree/0.1 sec.; hereinafter the same]<br>Control toughness R1/Q1<br>PS ratio |
| Conclusion | Shift up one gear |
| Meaning of rule | "When vehicle is accelerating and throttle opening is constant, if PS ratio is near 1.0 and control toughness is good then shift up by one gear position." |

This is the rule for shifting up during acceleration. During acceleration the engine speed should be relatively high, the rate of acceleration is on the rise and the throttle valve is opening (not returning in the closing direction). As was explained earlier, the decision regarding shifting up is made with reference to the PS ratio and the control toughness. Thus if these are in a satisfactory state, it is permissible to shift one gear up even during acceleration.

| Rule 8 | |
|---|---|
| Parameters used | Current gear position So<br>Desired PS ratio |
| Conclusion | Do not shift |
| Meaning of rule | "If throttle has suddenly returned to fully closed position then maintain current gear position." |

What this means is that the transmission should not be shifted when driving in the top gear if the PS ratio (a yardstick of shiftdown motivation) is small.

| Rule 9 | |
|---|---|
| Parameters used | Acceleration $a$<br>Throttle opening change Delta$\theta$TH<br>Control toughness R1/Q1<br>Engine speed Ne |
| Conclusion | Shift up one gear |
| Meaning of rule | "When vehicle is accelerating moderately, if engine speed is not low and control toughness is good then shift up by one gear position." |

When the vehicle is gaining speed at a moderate rate, the acceleration a is not a very useful index. Therefore, on the condition that the engine speed is relatively high, a decision is made to shift up. As the decision relates to a shiftup operation, a good control toughness is of course also a condition. The reason for not making a judgment regarding the PS ratio is that it was considered appropriate to use the PS ratio as an index only in cases where the vehicle acceleration is above a prescribed level.

| Rule 10 | |
|---|---|
| Parameters used | Time lapse from gearshift operation [sec.]<br>Throttle opening change Delta$\theta$TH |
| Conclusion | Do not shift |
| Meaning of rule | "Immediately after gearshift operation, if throttle opening is unchanged then do not shift." |

This rule is based on the assumption that if the throttle opening does not increase greatly soon after a shifting operation, the driver does not wish to change gears. Therefore, a prescribed period following gearshift of, for example, 1.6 to 2.5 seconds is established as a dead zone.

| Rule 11 | |
|---|---|
| Parameters used | Desired PS ratio<br>Throttle opening change Delta$\theta$TH |
| Conclusion | Do not shift |
| Meaning of rule | "Even if throttle is opened if desired PS ratio is small then do not shift." |

While the motivation to shift down is judged from the desired PS ratio and the gear position to be shifted to is decided on the basis of the desired post-gearshift PS ratio, since the fact that the desired PS ratio is small means that the actual vehicle horsepower change is greater than the horsepower change desired by the driver, there is no need to shift down and increase the horsepower. Thus there is no need to shift.

| Rule 12 | |
|---|---|
| Parameters used | Control toughness<br>Post-gearshift engine speed [rpm; hereinafter the same]<br>PS ratio<br>Throttle opening change Delta$\theta$TH |
| Conclusion | Shift up three gears |
| Meaning of rule | "If throttle has returned in closing direction indicating intention to cruise then shift up three gear positions for optimizing both control toughness and fuel economy." |

From the fact that the throttle has returned in the closing direction it can be interpreted that the driver wishes to cruise. Moreover, if it can be anticipated that shifting will reduce the engine speed, it will be wise to shift from the point of fuel economy. Therefore, if the PS ratio, which represents the ratio between the actual horsepower and that desired by the driver, is near or greater than 1.0, it can be judged that the driver is motivated to shift up. Thus, if a satisfactory degree of toughness control can be expected after shifting up, a shiftup operation is carried out. Rules 13 and 14 are identical to this Rule 13, except that they relate to the cases of shifting up by two gear positions and one gear position, respectively.

| Rules 15 to 17 | |
|---|---|
| Parameters used | Desired PS ratio<br>Desired post-gearshift PS ratio (values for 1, 2 and 3 gear positions lower) |
| | Post-gearshift engine speed (values for 1, 2 and 3 gear positions lower) |
| Conclusion | Shift down three (two, one) gear positions |
| Meaning of rule | "If throttle has been opened but vehicle cannot keep pace then shift down three (two, one) gear positions so as to obtain PS ratio of 1.0." |

Rules 15 to 17 are kickdown rules. When the desired PS ratio, which represents the change in horsepower desired by the driver and the actual change in horsepower, is large, it is judged necessary to shift down. Therefore, an evaluation is made with respect to the gear positions one to three positions lower than the current position as regards the relationship between the horsepower change desired by the driver and the actual change in horsepower (i.e. the post-gearshift PS ratio).

| Rule 18 | |
|---|---|
| Parameter used | Vehicle speed only |
| Conclusion | Maintain current gear position |
| Meaning of rule | "If vehicle speed is very low or zero then maintain current gear position (the 1st gear)." |

Thus rule is provided because in the absence of a rule to be selected when the vehicle is being stopped, there is a possibility that some other rule might be selected on the basis of a low grade value.

| Rules 19 and 20 | |
|---|---|
| Parameter used | Control toughness (for one gear position higher) |
| Conclusion | Maintain current gear position |
| Meaning of rule | "If shifting up is predicted to result in lack of control toughness then maintain current gear position." |

This rule is supplementary to the shiftup rules and is established because the other shiftup rules prescribe only that shiftup is to be carried out when the control toughness is good. Thus, in the absence of the present rule, it might be possible that shiftup will occur even if the control toughness is not good, if the degree of satisfaction of the other rules is lower, which runs counter to one object of the present invention, namely to avoid giving the driver a busy feeling.

The retrieval of rules will now be explained with reference to the flowchart of FIG. 23. In the first step S700 of this flowchart, the grade values of the membership functions are computed. This computation is carried out in accordance with the subroutine of FIG. 25. In the first step S800 of this subroutine, the data for the respective physical quantity (parameter) numbers are set and then in the following step S802, the address code numbers n of the address registers are initialized (initial value=1). The procedure then advances to step S804 in which the CNth membership value (grade) (DAT) is read.

This process will now be explained with reference to FIGS. 26 to 28. Data such as those shown in FIG. 26 are stored in the ROM of the microcomputer mentioned earlier. These data are stored for the respective parameters (e.g. the vehicle speed and the like) and include membership functions defined in tabular form with the physical quantities represented on a universe of discourse (the horizontal axis). Each set of so tabulated data is assigned a physical quantity number and an address (code number). The membership functions of these physical quantities (parameters) were explained with reference to the rules of FIGS. 24(a) to 24(e). Where more than one membership function (waveform) are defined with respect to one and the same physical quantity, each membership function is assigned its own address. FIG. 27 shows a computation table prepared in the RAM, into which the values measured or computed for each of the physical quantities are written. FIG. 28 shows a computation table prepared in the RAM, into which are written the results obtained when data of the table of FIG. 27 are applied to the table of FIG. 26 for computing the membership value (grade) for the respective code numbers of the table of FIG. 26.

Thus the procedure of step S800 in the flowchart of FIG. 25 means that of writing the measured and computed data into the computation table of FIG. 27, the procedure of step S802 means that of setting the value of the address register indicating the address code in FIG. 26 to the initial value "1", and the procedure of step S804 means that of using the computation table of FIG. 27 to apply the measured values to the membership function table of FIG. 26 for computing the grade value for each address (code number). Regarding this last procedure carried out in step S804, presume for example that the measured value of the vehicle speed appearing at the top of the table of FIG. 26 is 120 km/h. When the value of 120 km/h is applied to the corresponding membership function it is found that the grade value corresponding to this vehicle speed is 0.0 and it is this grade value that is read out in step S804. It should be noted that the membership functions shown in FIG. 26 are mere an example so that they do not coincide with those actually used in rules shown in FIGS. 24(a) to 24(e). In the next step S806, the read-out datum is defined as the grade value Mu(CN) for the code number concerned and then in step S810 the code number is incremented and the aforesaid procedures are repeated until it has been confirmed that the grade values have been read for all code numbers.

Figure 29:
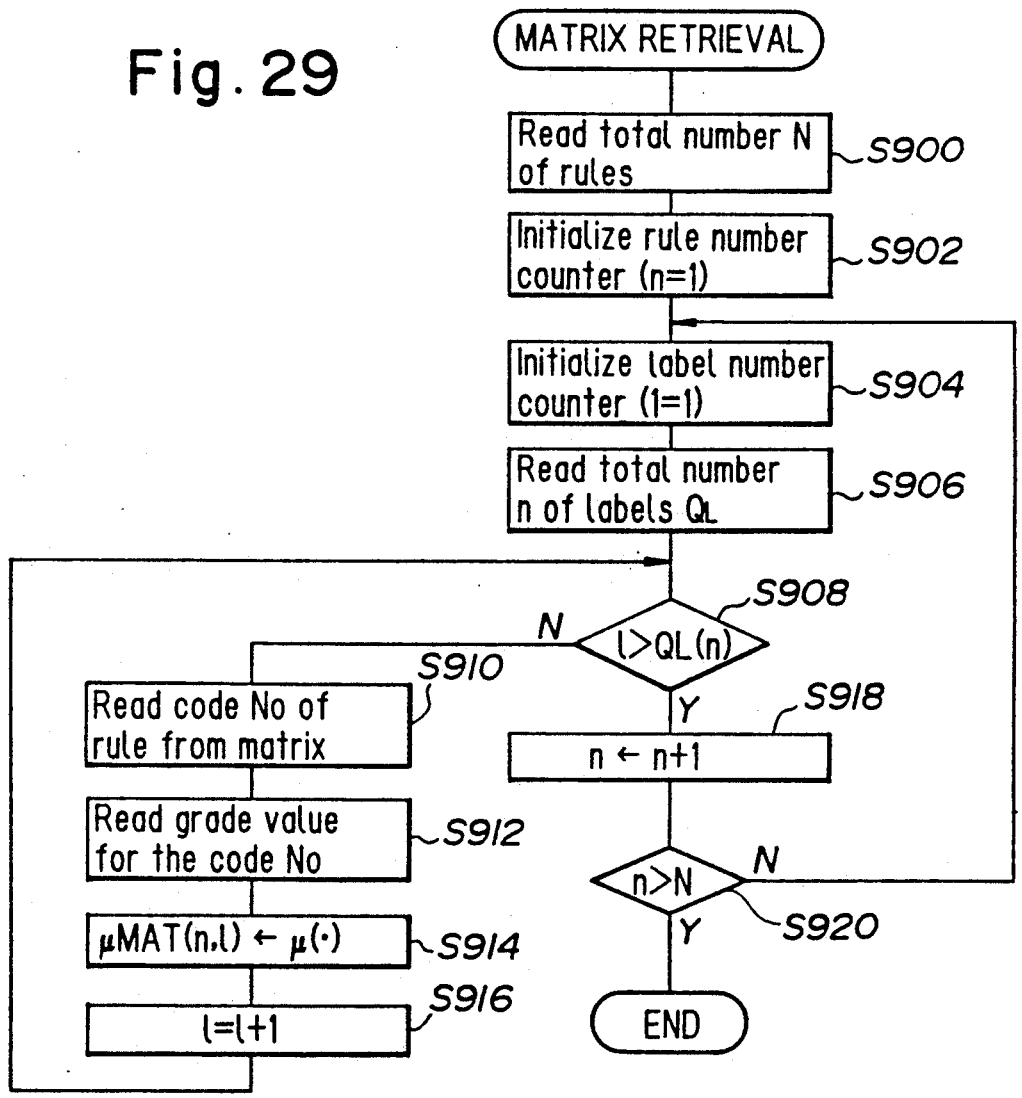
FIG. 29 is a flowchart showing a subroutine of the flowchart of FIG. 23, for compiling a retrieval matrix.

Returning to FIG. 23, the procedure advances to step S702 in which a retrieval matrix is compiled. The flowchart of a subroutine for compiling this matrix is shown in FIG. 29. More specifically, the group of rules shown in FIGS. 24(a) to 24(e) are actually stored in the ROM in the form of a matrix as shown in FIG. 30. The purpose of the subroutine of FIG. 23 is to apply the grade values obtained earlier to the matrix of FIG. 30 and to write the results obtained into the retrieval matrix of FIG. 33, which is stored in the RAM. The procedure will now be explained.

First, is step S900, the total number of rules N is read. In the present example N=20. Next, in step 902, the number n of a counter for indicating the current rule number is initialized to "1" (indicating Rule 1), and in step S904 the number "1" of a counter for indicating the current label number is initialized to "1" (indicating the first label of Rule 1). Taking Rule 2 as an example, the labels refer to the current gear position, the vehicle speed and the throttle opening and these are designated label No. 1, Label No. 2 and Label No. 3, respectively.

In the following step S906 the total number of labels QL is read. In the case of Rule 2, QL=3. The procedure then moves through step S908 to step S910 in which the code number of the rule concerned is read from the rule matrix shown in FIG. 30. In the case of Rule 2, for example, the code numbers for the current gear position, the vehicle speed and the throttle opening (shown in FIG. 26) would be read. Next, in step S912, the grade value computed earlier for the code number concerned is read and in step S914 is written into the retrieval matrix of FIG. 31. In step S916, the label number is incremented.

When it has been confirmed in step S908 that the data for all labels related to the rule have been read, the procedure advances to step S918 in which the rule No. is incremented and the aforesaid procedures are repeated. The subroutine is concluded when it is found in step S920 that the procedure has been conducted for all of the rules.

Figure 32:
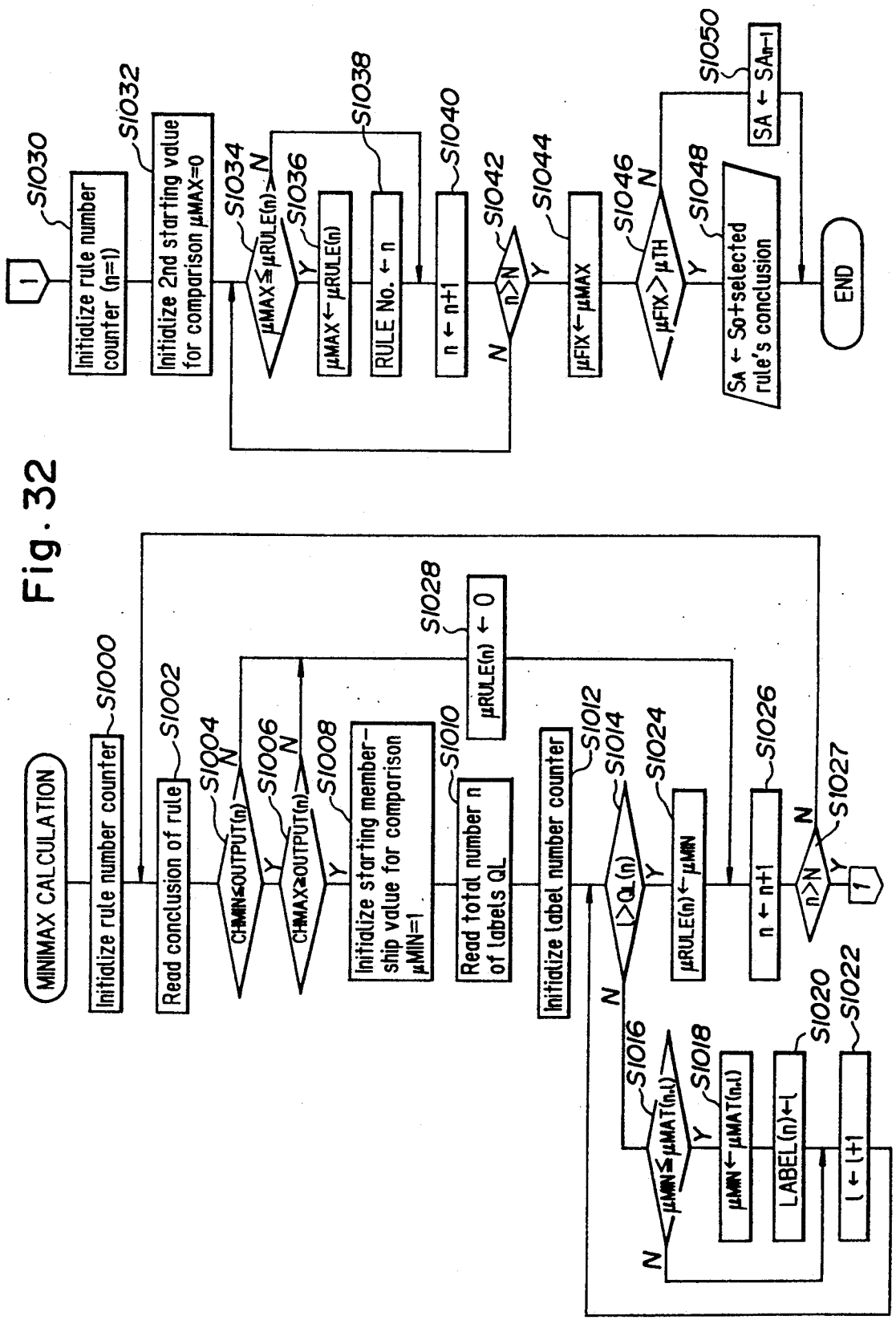
FIG. 32 is a flowchart showing an output determination subroutine of the flowchart of FIG. 23.

Returning to the main routine of FIG. 23, the procedure moves to the final step S704 in which the output is determined in the manner shown in the subroutine of FIG. 32. This subroutine is for carrying out the so-called minimax computation and involves the work of using the membership values obtained earlier to determine the degree of satisfaction of the respective rules and the label numbers that determine this degree of satisfaction, and of selecting the rule with the highest degree of satisfaction and determining the control command value.

Figures 33, 34:
FIGS. 33 and 34 are explanatory charts showing tables stored in a ROM and a RAM for use in the subroutine of FIG. 32.

First, in step S1000, the rule number counter is initialized and then in the following step S1002, the conclusion of the first rule is read. FIG. 33 shows a rule map stored in the ROM, and the conclusion is read out with reference to this map. For example, the conclusion of the first rule is "Shift up one gear (+1)".

In the succeeding steps S1004 and S1006, it is judged whether or not it is possible to implement the shift up or down operation of the conclusion. For example, if the present gear position is the 3rd, it is found to be possible to shift up one gear. Then the starting membership value for comparison is initialized in step S1008 (initial value=1.0), the total number of labels of the first rule is read in S1010, the label number counter is initialized in step S1012, the procedure passes through step S1014 to step 1016 in which the grade value obtained earlier for the first label is compared with the starting value, then if the grade value is smaller it is replaced with the starting value in step S1018, the resulting value is provisionally adopted as the grade of the label concerned in step S1020, the label number is incremented in step S1022 and after returning to step S1014 the same procedures are repeated, whereafter it is judged whether the procedure has been conducted for all labels in step S1014 and when it has, the procedure moves to step S1024 in which the smallest retrieved value is adopted as representing the rule concerned and then to step 1026 in which the procedure advances to the next rule. And, the same procedures are repeated until it has been confirmed in step S1027 that the procedure has been carried out for all of the rules. When the determination is No in step S1004 or step 1006, the value representing the rule is set to zero in step S1028.

From step S1028 the procedure advances to step S1030 in which the rule number counter is initialized (initial value=1) and then to step 1032 in which the second starting value for comparison is initiated (initial value=0), whereafter the representative value (minimum value) for the first rule is compared with the second starting value in step S1034. If the representative value is not smaller, the procedure then advances to step S1036 in which the starting value is replaced with the representative value, to step 1038 in which the rule is provisionally adopted as that having the highest degree of satisfaction, and to step S1040 in which the rule number is incremented for repeating the same procedures for the next and following rules. When it has been confirmed in step S1042 that the procedure has been carried for all of the rules, the largest value obtained is adopted as the finally selected degree of rule satisfaction.

The procedures then moves to step S1046 in which the selected value is compared with an appropriately set reference value MuTH and if the selected value is larger, the procedure advances to step S1048 in which the conclusion of the rule concerned is implemented by determining the output gear position SA from the current gear position So. On the other hand, if the selected value is not larger, the rule selected in step S1044 is abandoned, whereafter the control value SAn−1 of the preceding cycle is used. The reason for establishing this reference value is that the minimax computation only selects the rule which is relatively better in comparison with the others. This means that a rule may be selected even though it is not well suited to the state of operation, simply because the other rules have been evaluated at even lower values. The establishment of the reference value eliminates this possibility. The charts of FIG. 34 are for explaining a computation used in the output determination routine. As was mentioned earlier, in the present embodiment, the maximum membership values differ depending on the rule, which is advantageous in that it prevents the selection of an inappropriate rule. More specifically, the rules are assigned higher maximum membership values in the order of their increasing importance so that the probability of a more important rule becomes proportionally higher, with the result that selection of an inappropriate rule can be prevented.

Returning once more to FIG. 3, in step S18 the solenoids 36 and 38 are energized/deenergized in accordance with the determined control command value so as to shift the transmission to a new gear position or hold it in the current gear position, as the case may be. At the same time, the gearshift command flag is turned on in the microcomputer.

As explained in the foregoing, in the present embodiment the relationship between the amount of output desired by the driver and the actual output of the vehicle is quantitatively measured and used as a parameter in addition to such parameters as the throttle opening and the vehicle speed, a plurality of rules inferred from an analysis of the judgments and operations of an expert driver of a vehicle equipped with a manually shifted transmission are established, and fuzzy reasoning is applied for evaluating the rules and selecting the optimum value. As a consequence of this arrangement, the vehicle operating conditions, including those relating to the surrounding circumstances, are grasped as a plurality of variables and instantaneously processed, whereby an automatic transmission can be controlled in a manner resembling that in accordance with the judgments and operations of an expert driver driving a vehicle with a manually shifted transmission. Thus by use of fuzzy techniques it is possible to achieve appropriate control similar to the manual gearshift operations of a human being and to eliminate the shortcomings of the prior art technology such as that of the system being restricted to the set data and the gearshift timing being determined solely on the basis of the throttle opening and the vehicle speed. Further, by increasing the number of rules beyond those disclosed in the foregoing, it becomes possible to realize gearshift control in ways that enhance compliance with emission regulations and to respond more flexibly to gearshift control characteristics desired by customers. In this sense, the system according to this invention is totally different from conventional systems in purpose, makeup and effect.

FIG. 35 shows the distinguishing feature of a second embodiment of the present invention and relates to another technique of avoiding the selection of inappropriate rules. The technique is used in place of that described above in connection with the final steps of the flowchart of FIG. 32. Specifically, FIG. 35 shows fuzzy production rules similar to those of FIGS. 24(a) to 24(e), the rules shown constituting only one portion of all of the rules used in this second embodiment. What characterizes this second embodiment is that complements of the membership coefficients are established. What this means is that, for example, after Rule 7 in the first embodiment there is established a Rule 7a in which there is included a complement of the membership coefficient of a main parameter such as the acceleration a. Therefore, when it is unlikely that the vehicle is accelerating, namely when the acceleration is low, the evaluation value of Rule 7a will be higher than that of Rule 7 so that selection of Rule 7 can be prevented, regardless of whether or not Rule 7a is selected. The other features of the second embodiment are the same as those of the first embodiment and provide the same advantages. It should be noted that complements may be established for all of the rules or, alternatively, only for specific ones. Further, complements may be established with respect to all parameters included in a given rule or only with respect to certain ones thereof.

While the present invention has been explained with respect to a transmission having a finite number of gear positions, it will be understood that this is not limitative and that the invention can be applied with like effect for the control of Continuously Variable Transmissions (CVT) and further for Traction Controls (ASR) or the like.

It should be, furthermore, noted that, while the above description discloses preferred embodiments of the invention, numerous modifications or alternations may be made without departing from the scope of the invention as set forth in the following claims.

What is claimed is:

1. A system for controlling a vehicle automatic transmission with a plurality of gears having different gear ratios, comprising;
   control means for determining operating conditions of the vehicle including engine speed, degree of throttle opening, change in the throttle opening degree, vehicle speed, change in the vehicle speed and gear currently engaged, said control means further comprising
   means for predicting, with respect to gears to which it is possible to shift to from the gear currently engaged, changes in vehicle operating conditions, including change in reserve motive force available and a first ratio between change in engine output power estimated to be desired by the driver on the basis of the detected throttle opening and the change therein and actual change in engine output power, which would occur upon shifting to each of such gears not currently engaged;

means for establishing a membership function for the determined values and the predicted values of operating conditions in accordance with a plurality of predetermined fuzzy production rules defining a plurality of respective gearshift conclusions;

means for carrying out fuzzy reasoning based on the fuzzy production rules to determine a gear to be engaged; and actuator means for driving a gear shift valve mechanism in response to the determined gear to be engaged.

2. A system according to claim 1, wherein said control means further predicts, with respect to gears to which it is possible to shift to from the gear currently engaged, change in the engine speed which would occur upon shifting to each of such gears.

3. A system according to claim 1, wherein said control means calculates a second ratio between change in engine output power estimated to be desired by the driver on the basis of the detected throttle opening and the change therein and the actual change in the engine output power.

4. A system according to claim 3, wherein said second ratio is used for determining downshifting and said first ratio is used for determining the gear to be shifted down to.

5. A system according to claim 1, wherein said reserve motive force is used for determining upshifting.

6. A system according to claim 5, wherein said control means calculates the ratio between engine output power estimated to be desired by the driver on the basis of the detected throttle opening and actual engine output power, and the ratio is used for determining upshifting together with the predicted reserve motive force.

7. A system according to claim 5, wherein said reserve motive force is predicted on the basis of the ratio of the motive force to driving resistance.

8. A system according to claim 7, wherein said driving resistance is calculated on the basis of the change in the vehicle speed.

9. A system according to claim 8, wherein said driving resistance is adjusted in proportion to a slip factor of said gearshift mechanism.

10. A system according to claim 1, wherein said control means determines the gear to be engaged by selecting one of said plurality of fuzzy production rules and a respective gearshift conclusion based on at least one of the detected and predicted values.

11. A system according to claim 10, wherein said rule selection is carried out by calculating a membership value of the detected or predicted values.

12. A system according to claim 11, wherein said membership value is compared with a prescribed value and if the membership value is found to be not larger than the prescribed value, the selection of the rule is canceled.

13. A system according to claim 10, wherein said rules include a rule whose membership function complements that of another.

14. A system according to claim 10, wherein the maximum value of said membership function differs among said rules.

15. A system according to claim 14, wherein said rule assigned the maximum membership value is a rule for protecting the engine from damage.

16. A system for controlling a vehicle automatic transmission with a plurality of gears having different gear ratios, comprising;

control means for determining operating conditions of the vehicle including engine speed, degree of throttle opening, change in the throttle opening degree, vehicle speed, change in the vehicle speed and gear currently engaged, said control means further comprising means for predicting, with respect to gears to which it is possible to shift to from the gear currently engaged, changes in vehicle operating conditions, including PS ratio and reserve motive force available, which would occur upon shifting to each of such gears not currently engaged;

means for establishing a membership function for at least one of the determined values and the predicted values of operating conditions in accordance with a plurality of predetermined fuzzy production rules defining a plurality of respective gearshift conclusions;

means for carrying out fuzzy reasoning based on the fuzzy production rules to determine a gear to be engaged; and actuator means for driving a gear shift valve mechanism in response to the determined gear to be engaged.

17. A system for controlling a vehicle automatic transmission with a plurality of gears having different gear ratios, comprising control means for determining operating conditions of the vehicle including engine speed, degree of throttle opening, change in the throttle opening degree, vehicle speed, change in the vehicle speed and gear currently engaged, said control means further comprising means for predicting, with respect to gears to which it is possible to shift to from the gear currently engaged, changes in vehicle operating conditions, including control toughness and change in reserve motive force available, which would occur upon shifting to each of such gears not currently engaged;

means for establishing a membership function for at least one of the determined values and the predicted values of operating conditions in accordance with a plurality of predetermined fuzzy production rules defining a plurality of respective gearshift conclusions;

means for carrying out fuzzy reasoning based on the fuzzy production rules to determine a gear to be engaged; and actuator means for driving a gear shift valve mechanism in response to the determined gear to be engaged.

* * * * *